(12) United States Patent  
Horiyama

(10) Patent No.: US 8,218,169 B2  
(45) Date of Patent: Jul. 10, 2012

(54) INFORMATION PROCESSING APPARATUS, INFORMATION PROCESSING METHOD, JOB MANAGEMENT SYSTEM, AND INFORMATION PROCESSING PROGRAM

(75) Inventor: Jun Horiyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1114 days.

(21) Appl. No.: 11/092,073

(22) Filed: Mar. 29, 2005

(65) Prior Publication Data

US 2005/0219596 A1 Oct. 6, 2005

(30) Foreign Application Priority Data

Mar. 30, 2004 (JP) ................................ 2004-100620

(51) Int. Cl.
- *G06F 3/12* (2006.01)
- *G06K 15/00* (2006.01)
- *H04L 12/66* (2006.01)
- *H04L 12/56* (2006.01)
- *G06F 15/173* (2006.01)
- *G06F 15/16* (2006.01)
- *G06F 3/00* (2006.01)

(52) U.S. Cl. ......... 358/1.15; 358/1.1; 358/1.16; 400/61; 370/352; 370/389; 709/223; 709/227; 709/203; 709/247; 710/8; 710/15

(58) Field of Classification Search ............... 358/1.1, 358/1.15, 1.16; 400/61; 370/352, 389; 709/223, 709/227, 203, 247; 710/8, 15, 321, 330

See application file for complete search history.

(56) References Cited

U.S. PATENT DOCUMENTS

| | | | | |
|---|---|---|---|---|
| 6,814,510 B1 * | 11/2004 | Sabbagh et al. | ............... | 400/63 |
| 7,093,011 B2 * | 8/2006 | Hirata et al. | .................. | 709/223 |
| 2002/0089692 A1 * | 7/2002 | Ferlitsch | ...................... | 358/1.15 |
| 2002/0138564 A1 * | 9/2002 | Treptow et al. | ............... | 709/203 |
| 2003/0128386 A1 * | 7/2003 | Kim | .............................. | 358/1.15 |
| 2005/0052660 A1 * | 3/2005 | Sabbagh et al. | ............... | 358/1.1 |

FOREIGN PATENT DOCUMENTS

| | | |
|---|---|---|
| JP | 2001-117834 A | 4/2001 |
| JP | 2001-265546 A | 9/2001 |
| JP | 2001-282475 A | 10/2001 |
| JP | 2004-005258 A | 1/2004 |

* cited by examiner

*Primary Examiner* — King Poon  
*Assistant Examiner* — Neil R McLean  
(74) *Attorney, Agent, or Firm* — Rossi, Kimms & McDowell LLP

(57) ABSTRACT

An information processing apparatus which is capable of reducing a burden on both an administrator and users when a job accounting system is introduced, to thereby enable efficient execution of job management. A client computer 1010 has a printer driver 1015 installed therein for generating an output job to be output to a peripheral apparatus, and delivers the output job to the peripheral apparatus via a first port monitor 1017 preset to a port as the output destination of the printer driver 1015. A second port monitor 1016 receives the output job generated by the printer driver 1015 and delivers the output job to the peripheral apparatus and collects job information on the output job. The port as the output destination of the device driver is switched from the port monitored by the first port monitor 1017 to a port monitored by the second port monitor 1016 when a system in which the job information is acquired using the second port monitor is constructed.

29 Claims, 14 Drawing Sheets

FIG. 8

| | ITEM | CONTENT |
|---|---|---|
| 901 | OUTPUT DEVICE | MFP-1 |
| 902 | JOB INFORMATION ACQUISITION METHOD | APPARATUS JOB HISTORY |
| 903 | TIME | 1999/11/01 pm5 GMT |
| 904 | SHEET TYPE | OHP |
| 905 | NUMBER OF PAGES | 7 |
| 906 | NUMBER OF SHEETS | 4 |
| 907 | SHARED PRINTER | NO |
| 908 | ISSUER | TARO YAMADA |
| 909 | MODE | COLOR |
| 910 | DOCUMENT NAME | SECRET DOCUMENT.txt |
| 911 | SINGLE-SIDED/DOUBLE-SIDED INFORMATION | DOUBLE-SIDED |
| 912 | N in 1 INFORMATION | 1 |
| 913 | TEMPORARY FLAG | ON |

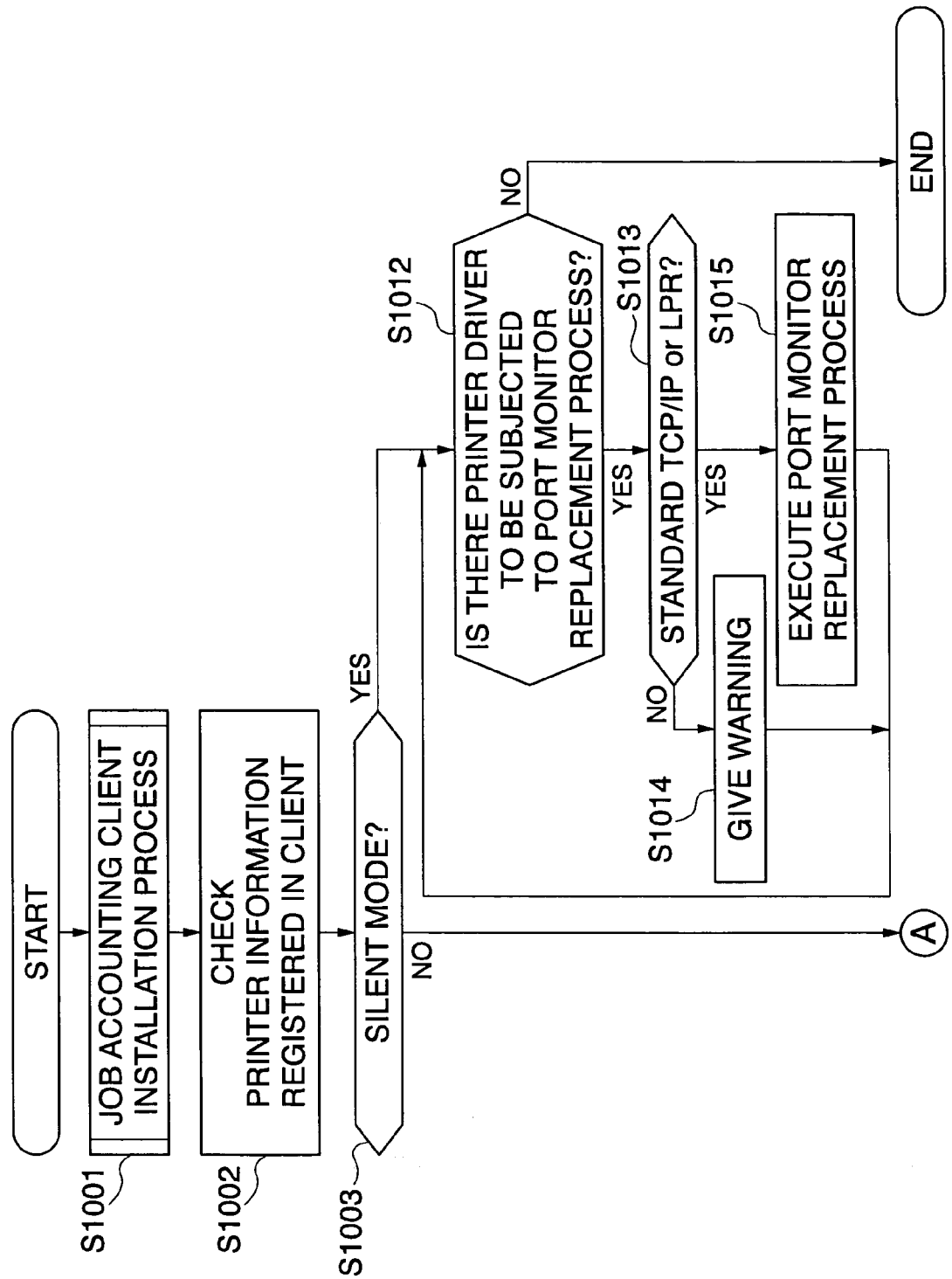

FIG. 11

ERROR!!  ☒

❌ Replace port failed << Printer=××Co. XY S 2450 (MS) >>

[CLIENT USER A]

| JACA VERSION | PRINTER NAME | PORT | . . . . |
|---|---|---|---|
| Ver 2.1 | C-LBP-XXX | IP_172.24.93.179 | |
| | C-iR-YYY | 172.24.93.179:lpr | |
| | L-OP-ZZZ | LX-port | |
| | . . . | | |

1501 / 1502 / 1503

[CLIENT USER B]

| JACA VERSION | PRINTER NAME | PORT | . . . . |
|---|---|---|---|
| Ver 2.0 | C-LBP-XXX | IP_172.24.93.179 | |
| | C-iR-YYY | 172.24.93.179:lpr | |
| | H-LP-ZZZ | HX-port | |
| | . . . | | |

1501 / 1502 / 1503

INFORMATION PROCESSING APPARATUS, INFORMATION PROCESSING METHOD, JOB MANAGEMENT SYSTEM, AND INFORMATION PROCESSING PROGRAM

BACKGROUND OF THE INVENTION

1. Field of the Invention

The present invention relates to an information processing apparatus, an information processing method, a job management system, and an information processing program, which are capable of carrying out job accounting when peripheral apparatuses on a network are used by users via client computers or the like.

2. Description of the Related Art

Conventionally, peripheral apparatuses, such as printers (printing apparatuses), scanners, and copying machines, connected to a network have been used by users at their discretion, which makes it difficult for the administrator (operator) of the peripheral apparatuses or the network to perform management based on a firm grasp of what each peripheral apparatus is used for or what processing is carried out by the peripheral apparatus, even though the administrator can take a general view of the status of use by each user.

Further, when a limit can be set to the use of a peripheral apparatus by a user, the administrator grasps the use status of the peripheral apparatus, calculates the limit according to the use status, and notifies the user of the limit. However, this operation places a burden on the administrator. To solve the problems described above, a job accounting system has been proposed, which carries out a job accounting operation on the use of peripheral apparatuses (see Japanese Laid-Open Patent Publication (Kokai) No. 2001-282475). FIG. 16 shows the proposed job accounting system.

As shown in FIG. 16, the conventional job accounting system is comprised of client computers 1410 and 1420 as information processing apparatuses, a base server computer 1430, a printer 1440 provided with a job history storing function for storing a job history (print history), a MFP (Multi Function Printer) 1450 provided with a printer function, a copy function, a scanner function, and a job history storing function, and a printer 1460 which is not provided with the job history storing function.

In the client computer 1410, when an application 1411 for generating documents calls a GDI (Graphics Device Interface) 1412 as a graphics engine of an operating system (hereinafter, simply referred to as "the OS"), the GDI 1412 generates print data using a printer driver, not shown, in response to an instruction from the application 1411, and sends the print data to a spooler 1413.

A job accounting client application 1414 is a software module installed for executing job accounting. The job accounting client application 1414 monitors (hooks) calling (print request) of the GDI 1412 by the application 1411 and accumulates job information on print jobs containing print data. This job information includes the number of print sheets, the number of pages, a print size, the type of sheets to be used, information indicative of whether the printing is to be executed in a single-sided printing mode or a double-sided printing mode, and N in 1 print information (information for specifying the number of pages to be printed on one face of each sheet). The job accounting client application 1414 periodically sends the accumulated job information to a job accounting server application 1431 provided in the base server computer 1430.

On the other hand, in the client computer 1420, a job accounting client application 1424 periodically monitors a spooler 1423. As a result, when there is a print job spooled in the spooler 1423, the job accounting client application 1424 acquires the job information on the print job using an API (Application Program Interface). Then, the job accounting client application 1424 sends the job information acquired by periodically monitoring the spooler 1423 to the job accounting server application 1431 in the base server computer 1430.

Thus, in the conventional job accounting system, acquisition of job information including the number of print sheets, a sheet size, and so forth by the client computer 1410 is performed by the above described method in which the job accounting client application 1414 acquires job information by hooking the calling of the GDI 1412 by the application 1411, or a method of monitoring a logical printer on Windows (registered trademark), periodically issuing "Win32 API GetJob" over a time period from input of a print job to erasing of the same, and referring to the acquired information. Therefore, in the conventional job accounting system, the use time of the CPU and resources in the client computer 1410 are inadvertently wasted, which can increase load on the client computer 1410. This also applies to the client computer 1420.

To solve the problem with the conventional job accounting system, it is envisaged to use a port monitor dedicated to the job accounting system. For example, the client computer 1410 is configured such that the output destination of the printer driver is set to a port monitored by a dedicated port monitor of the job accounting system, and the dedicated port monitor of the job accounting system is activated when print data is to be transmitted to a peripheral apparatus, to deliver job information on the print job to the job accounting client application 1414. The use of this configuration makes it possible to eliminate the need to hook the calling of the GDI 1412 by the application 1411 and the need to periodically monitor the spooler 1413.

In the existing client computer 1410, however, the printer driver and a port monitor (i.e. a port monitored thereby) associated therewith have already been set by the OS, and therefore the user needs to carry out an operation for switching the output destination of the printer driver to a port monitored by a dedicated port monitor of the job accounting system.

Further, in recent printing systems, numerous shared printers on a network are used by a plurality of client computers, so that each client computer has a plurality of printer drivers installed therein. Therefore, when the job accounting system is newly introduced, the administrator of the job accounting system has to help the users of the client computers under control to switch the ports monitored as the output destinations of printer drivers installed in each client computer to the ports monitored by the dedicated port monitors of the job accounting system. This operation is extremely troublesome for both the administrator of the job accounting system and the users, presenting a serious obstacle to introduction of the job accounting system.

SUMMARY OF THE INVENTION

It is an object of the present invention to provide an information processing apparatus, an information processing method, a job management system, and an information processing program, which are capable of reducing a burden placed on both an administrator and users when the job accounting system is introduced, to thereby enable efficient execution of job management.

To attain the above object, in a first aspect of the present invention, there is provided an information processing apparatus connected to at least one peripheral apparatus and having at least one device driver installed therein for generating an output job to be output to the peripheral apparatus, comprising a first port monitor that is preset to monitor a port as an output destination of the device driver, and receives the output job generated by the device driver and delivers the output job to the peripheral apparatus, a second port monitor that receives the output job generated by the device driver and delivers the output job to the peripheral apparatus, the second port monitor collecting job information on the output job, and a switching device that is operable when a system in which the job information is acquired using the second port monitor is constructed, to switch the port as the output destination of the device driver from the port monitored by the first port monitor to a port monitored by the second port monitor.

With the arrangement of the first aspect of the present invention, when constructing a system in which the job information on the output job generated by the device drivers is acquired using the second port monitor that receives the output job and delivers the output job to the peripheral apparatus, the port as the output destination of the device driver is switched from the port monitored by the first port monitor to a port monitored by the second port monitor. Therefore, the need for a system administrator and users using the information processing apparatus to carry out manual operations for switching the port to be monitored is eliminated, which makes it possible to reduce a burden placed on both the administrator and the users when the job accounting system is introduced, thereby executing job management efficiently.

Preferably, the switching device comprises a determining device that determines a port as the output destination of each device driver for the peripheral apparatus registered in the information processing apparatus, and a selecting device that displays a name of each port as the output destination of the associated device driver determined by the determining device and a name of the associated device driver, and allows selection of a device driver for which the port as the output destination thereof is to be switched, from the displayed name of each device driver, and the switching device switches the port as the output destination of the device driver selected by the selecting device to the port monitored by the second port monitor.

Preferably, the information processing apparatus further comprises a judging device that is operable when the system in which the job information is acquired using the second port monitor is constructed, to judge whether switching of the port monitored by the first port monitor to the port monitored by the second port monitor by the switching device should be carried out either in response to a selection instruction from a user or automatically.

Preferably, when the system in which the job information is acquired using the second port monitor is constructed, the switching device determines whether or not the first port monitor is of a predetermined type, and if the first port monitor is of the predetermined type, switches the port as the output destination to the port monitored by the second port monitor, whereas if the first port monitor is not of the predetermined type, displays a warning.

Preferably, the information processing apparatus further comprises a job information collecting device that collects the job information via an application program interface and delivers the collected job information to another information processing apparatus, and the second port monitor notifies the job information collecting device of the receipt of the output job, when the output job is received.

Preferably, the at least one peripheral apparatus includes a printer, a copying machine, and a scanner.

To attain the above object, in a second aspect of the present invention, there is provided an information processing method for an information processing apparatus that has at least one device driver installed therein for generating an output job to be output to at least one peripheral apparatus, and is configured to output the output job to the peripheral apparatus via a first port monitor preset to monitor a port as an output destination of the device driver or a second port monitor that monitors a port which can be set as the output destination of the device driver, comprising an outputting and collecting step of receiving the output job generated by the device driver and delivering the output job to the peripheral apparatus and collecting job information on the output job, using the second port monitor, and a switching step of switching the port as the output destination of the device driver from the port monitored by the first port monitor to the port monitored by the second port monitor when a system in which the job information is acquired using the second port monitor is constructed.

With this configuration, it is possible to provide the same advantageous effect as obtained by the first aspect of the present invention.

Preferably, the switching step comprises a determining step of determining a port as the output destination of each device driver for the peripheral apparatus registered in the information processing apparatus, and a selecting step of displaying a name of each port as the output destination of the associated device driver determined in the determining step and a name of the associated device driver, and allowing selection of a device driver for which the port as the output destination thereof is to be switched, from the displayed name of each device driver, and the switching step comprises switching the port as the output destination of the device driver selected in the selecting step to the port monitored by the second port monitor.

Preferably, the information processing method further comprises a judging step of judging whether switching of the port monitored by the first port monitor to the port monitored by the second port monitor in the switching step should be carried out either in response to a selection instruction from a user or automatically, when the system in which the job information is acquired using the second port monitor is constructed.

Preferably, the switching step comprises, when the system in which the job information is acquired using the second port monitor is constructed, determining whether or not the first port monitor is of a predetermined type, and if the first port monitor is of the predetermined type, switching the port as the output destination to the port monitored by the second port monitor, whereas if the first port monitor is not of the predetermined type, displaying a warning.

Preferably, the information processing method further comprises a job information collecting step of collecting the job information via an application program interface and delivering the collected job information to another information processing apparatus, and a control step of controlling the second port monitor in the job information collecting step such that the second port monitor notifies the receipt of the output job when the output job is received.

Preferably, the at least one peripheral apparatus includes a printer, a copying machine, and a scanner.

To attain the above object, in a third aspect of the present invention, there is provided a job management system comprising an information processing apparatus that has at least one device driver installed therein for generating an output job to be output to at least one peripheral apparatus, and is configured to output the output job to the peripheral apparatus via a first port monitor preset to monitor a port as an output destination of the device driver, and a job management apparatus that acquires job information on the output job from the information processing apparatus and manages the job information, wherein the information processing apparatus comprises a second port monitor that receives the output job generated by the device driver and delivers the output job to the peripheral apparatus, the second port monitor collecting job information on the output job, and a switching device that is operable when a system in which the job information is acquired using the second port monitor is constructed, to switch the port as the output destination of the device driver from the port monitored by the first port monitor to a port monitored by the second port monitor.

With this configuration, it is possible to provide the same advantageous effect as obtained by the first aspect of the present invention.

To attain the above object, in a fourth aspect of the present invention, there is provided an information processing program that is executable by a computer for implementing an information processing method for an information processing apparatus that has at least one device driver installed therein for generating an output job to be output to at least one peripheral apparatus, and is configured to output the output job to the peripheral apparatus via a first port monitor preset to monitor a port as an output destination of the device driver or a second port monitor that monitors a port which can be set as the output destination of the device driver, comprising an outputting and collecting module for receiving the output job generated by the device driver and delivering the output job to the peripheral apparatus and collecting job information on the output job, using the second port monitor, and a switching module for switching the port as the output destination of the device driver from the port monitored by the first port monitor to the port monitored by the second port monitor when a system in which the job information is acquired using the second port monitor is constructed.

With this configuration, it is possible to provide the same advantageous effect as obtained by the first aspect of the present invention.

Preferably, the switching module comprises a determining module for determining a port as the output destination of each device driver for the peripheral apparatus registered in the information processing apparatus, and a selecting module for displaying a name of each port as the output destination of the associated device driver determined by the determining module and a name of the associated device driver, and allowing selection of a device driver for which the port as the output destination thereof is to be switched, from the displayed name of each device driver, and the switching module switches the port as the output destination of the device driver selected by the selecting module to the port monitored by the second port monitor.

Preferably, the information processing program further comprises a judging module for judging whether switching of the port monitored by the first port monitor to the port monitored by the second port monitor by the switching module should be carried out either in response to a selection instruction from a user or automatically, when the system in which the job information is acquired using the second port monitor is constructed.

Preferably, when the system in which the job information is acquired using the second port monitor is constructed, the switching module determines whether or not the first port monitor is of a predetermined type, and if the first port monitor is of the predetermined type, switches the port as the output destination to the port monitored by the second port monitor, whereas if the first port monitor is not of the predetermined type, displays a warning.

Preferably, the information processing program further comprises a job information collecting module for collecting the job information via an application program interface and delivering the collected job information to another information processing apparatus, and a control module for controlling the second port monitor such that the second port monitor notifies the job information collecting module of the receipt of the output job, when the output job is received.

Preferably, the at least one peripheral apparatus includes a printer, a copying machine, and a scanner.

The above and other objects, features, and advantages of the invention will become more apparent from the following detailed description taken in conjunction with the accompanying drawings.

BRIEF DESCRIPTION OF THE DRAWINGS

FIG. 8 is a diagram showing an example of job information registered in a job history database appearing in FIG. 6;

FIGS. 9A and 9B are flowcharts of a port monitor replacement process;

FIG. 11 is a view showing an example of a GUI displayed for giving a warning during execution of the process in FIGS. 9A and 9B;

FIG. 12 is a diagram showing an example of user management information stored in a database provided in a base server computer according to a second embodiment of the present invention;

DETAILED DESCRIPTION OF THE PREFERRED EMBODIMENTS

Figure 1:
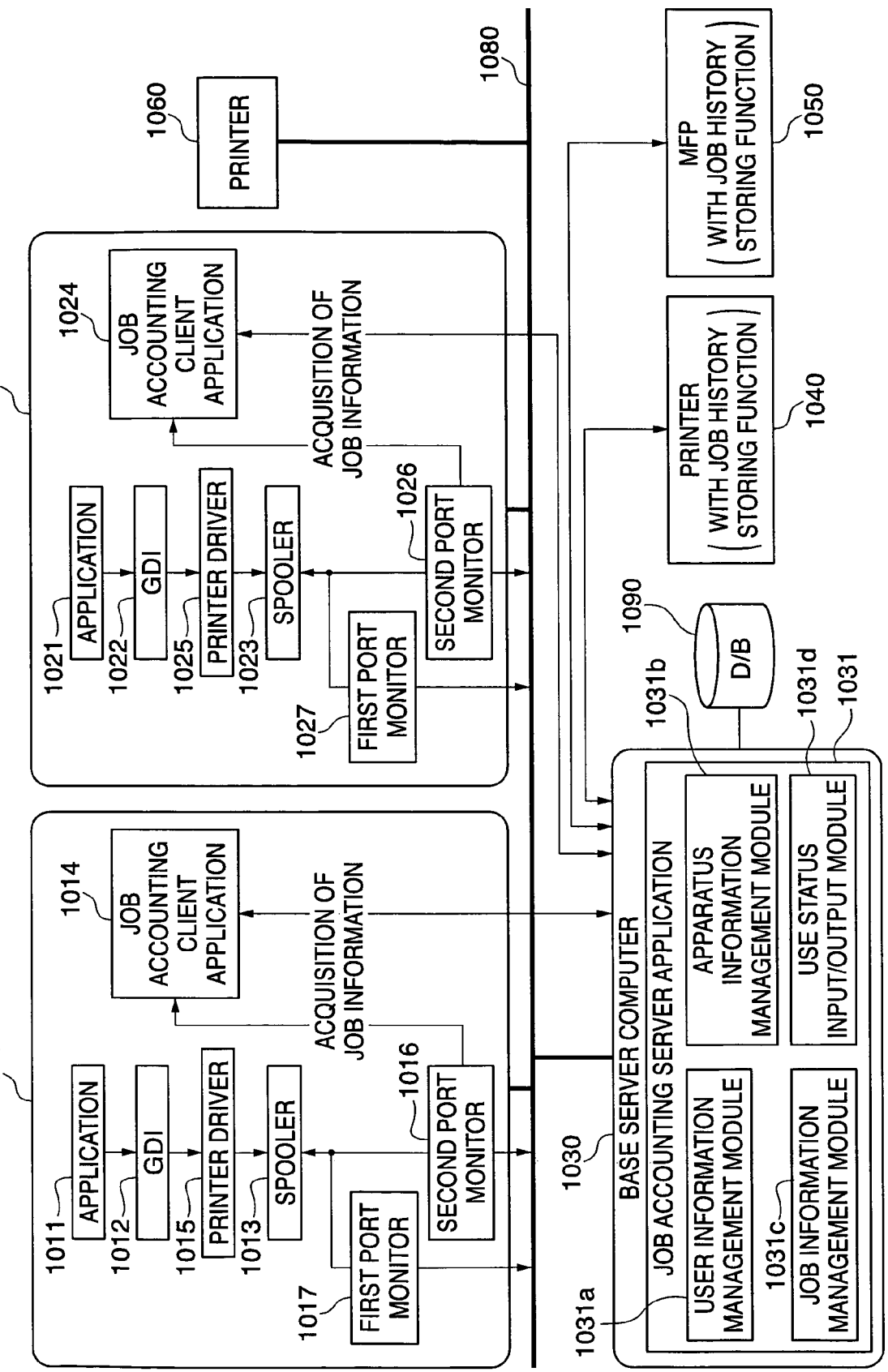
FIG. 1 is a diagram showing the basic configuration of a job accounting system including an information processing apparatus according to a first embodiment of the present invention.

The present invention will now be described in detail with reference to the drawings showing preferred embodiments thereof. In the drawings, elements and parts which are identical throughout the views are designated by identical reference numeral, and duplicate description thereof is omitted.

FIG. 1 is a diagram showing the basic configuration of a job accounting system including an information processing apparatus according to a first embodiment of the present invention.

As shown in FIG. 1, the present job accounting system (job management system) is comprised of client computers 1010 and 1020 as information processing apparatuses, a base server computer 1030 (job management apparatus), a printer 1040 provided with a job history storing function for storing print history (job history), a MFP (Multi Function Printer) 1050 provided with a printer function, a copy function, a scanner function, and a job history storing function, and a printer 1060 which is not provided with a job history storing function.

The client computers 1010 and 1020 as information processing apparatuses, the base server computer 1030, and the printers 1040 and 1060 and the MFP 1050 as peripheral apparatuses are interconnected via a network 1080, for communicating with each other. Further, these apparatuses can communicate with other apparatuses, not shown, connected to the network 1080.

The client computer 1010 includes software comprised of an application 1011 for generating documents, a GDI (Graphics Device Interface) 1012 as a graphics engine of an operating system (hereinafter, simply referred to as "the OS"), a spooler 1013, a job accounting client application 1014, a printer driver 1015 (device driver), a first port monitor 1017 preset to monitor a port as the output destination of the printer driver 1015, and a second port monitor 1016 dedicated to the job accounting system for monitoring a port for job accounting.

In the client computer 1010, the application 1011 calls the GDI 1012, and the application 1011 outputs a graphics function (GDI function: Graphics Device Interface function) to the GDI 1012. In response to an instruction from the application 1011, the GDI 1012 converts the GDI function into a graphics function (DDI function: Device Driver Interface function) interpretable by the printer driver 1015 and outputs the DDI function to the printer driver 1015.

The printer driver 1015 generates print data to be printed out by a destination printer, based on the DDI function received from the GDI 1012, and then designates a port to be monitored as the output destination of the print data and sends the print data to the spooler 1013. When the print data is spooled by the spooler 1013, if the port monitored by the second port monitor 1016 has been set to the port as the output destination of the printer driver 1015, the second port monitor 1016 transfers to a peripheral apparatus an output job for outputting the print data generated by the printer driver 1015 and collects job information on the output job. More specifically, the second port monitor 1016 notifies the job accounting client application 1014 that the print data has been spooled by the spooler 1013. If the job accounting client application 1014 has not been activated yet, the second port monitor 1016 causes the job accounting client application 1014 to be activated. If the port (e.g. a standard TCP/IP port or a LPR port) monitored by the first port monitor 1017 has been set to the output destination of the printer driver, the first port monitor 1017, which does not have a job information collecting function (log managing function), only transfers the output job for outputting the print data spooled by the spooler 1013 to the peripheral apparatus, followed by terminating its own processing.

When receiving the notification from the second port monitor 1016, the job accounting client application 1014 requests job information on the print job (output job) from the OS, using an API (Application Program Interface) and acquires the job information. The job information includes the number of print sheets, the number of pages, a print size, the type of sheets to be used, information indicative of whether the printing is to be executed in a single-sided printing mode or a double-sided printing mode, N in 1 print information (information for specifying the number of pages to be printed on one face of each sheet), information on a user who has issued the print request (i.e. user information), information on color printing (i.e. color information), and information on the name of a document to be printed (i.e. a document name).

The second port monitor 1016 communicates with a peripheral apparatus (the printer 1040 or 1060, or the MFP 1050) via the network 1080 and sends the print data if the peripheral apparatus as an output destination for the print data is on standby. The job accounting client application 1014 sends the acquired job information to a job accounting server application 1031 in the base server computer 1030.

The client computer 1020 includes software comprised of an application 1021, a GDI 1022, a spooler 1023, a printer driver 1025 (device driver), a first port monitor 1027 preset to monitor a port as the output destination of the printer driver 1025, and a second port monitor 1026 dedicated to the job accounting system for monitoring a port for job accounting. The application 1021, the GDI 1022, the spooler 1023, the printer driver 1025, the first port monitor 1027, and the second port monitor 1026 have the respective functions similar to the above described functions of the application 1010, the GDI 1012, the spooler 1013, the printer driver 1015, the first port monitor 1017, and the second port monitor 1016. The printer drivers 1015 and 1025 may be provided in numbers corresponding to the number of the peripheral apparatuses connected to the network 1080.

The base server computer 1030 is a job accounting server which performs job accounting when a peripheral apparatus, such as the printer 1040 or the MFP 1050, connected to the network 1080, is used by a user e.g. via the client computer 1010. The base server computer 1030 is provided with the job accounting server application 1031 as software.

The job accounting server application 1031 is comprised of a user information management module 1031a, an apparatus information management module 1031b, a job information management module 1031c, and a use status input/output module 1031d.

The user information management module 1031a stores and manages user information in a storage device, not shown, provided in the base server computer 1030. The user information is for identifying users who use the peripheral apparatuses. For example, the user information includes computer log-in names (names entered by respective users to log in to the computers) and network log-in names (names entered by the respective users to log in to the network system) of the peripheral apparatus users.

The apparatus information management module 1031b checks whether or not the peripheral apparatuses connected to the network 1080 have a job history storing function, and stores and manages apparatus information on peripheral apparatuses having the job history storing function and the other apparatuses having no job history storing function, in the storage device, not shown, in the base server computer 1030. The apparatus information includes printing speeds, color information and network addresses associated with the respective peripheral apparatuses, for example.

The job information management module 1031c receives job information from the job accounting client applications 1014 and 1024 and stores the received job information in a D/B 1090 as a job history database described in detail hereinafter. Further, the job information management module 1031c requests job history information (job information) from a peripheral apparatus (e.g. the printer 1040) having the job history storing function, and receives the job information from the peripheral apparatus via the use status input/output module 1031d. This sequential processing for requesting and receiving job information from a peripheral apparatus may be carried out not just once, but periodically. Further, the job accounting server application 1031 may be configured to carry out the above described processing when the storage capacity of a job history information storing section, not shown, of a peripheral apparatus becomes small and the use status input/output module 1031d is notified of the fact.

The use status input/output module 1031d acquires information on a use status, including a job history (job information), from a peripheral apparatus having the job history storing function. The use status input/output module 1031d is capable of causing the peripheral apparatus to print out or display on its monitor a use report (i.e. a report showing how many jobs have been carried out by each user) generated based on the acquired information.

The administrator (operator) of the job accounting system in FIG. 1 can grasp the use status of the peripheral apparatus by causing the use status input/output module 1031d to output the use report associated with the peripheral apparatus. More specifically, the use status input/output module 1031d outputs various use reports based on the user information, the apparatus information, and the job information stored in the storage device, not shown. The administrator can give an instruction for specifying an output form (output format) of the use report to the use status input/output module 1031d.

The use report is displayed e.g. on the display device, not shown, of the base server computer 1030. Further, the output data of the report may be sent to the client computer 1010 (1020) to be displayed on the display device, not shown, of the client computer 1010 (1020).

As the use report, data indicative of user-specific use amounts (the number of sheets used for printout and the amount of the toner used for printout) and use time of a peripheral apparatus are output. Further, data on use statuses associated with respective operation modes (functions) of each peripheral apparatus, such as the color printing mode and the double-sided printing mode, use statuses associated with the sizes of used sheets, and use statuses associated with the types of used sheets are output. Furthermore, a fee for use of each peripheral apparatus is set in the apparatus information, whereby a charge to be paid is output on an apparatus-by-apparatus basis or on a user-by-user basis.

Further, a fee for use of the apparatus is set to the apparatus information on an operation mode-by-operation mode basis, a sheet size-by-sheet size basis, and a sheet type-by-sheet type basis, so that there is output information on each user's total use charge calculated based on types of sheets used by the user, operation modes selected by the user, peripheral apparatuses used by the user, and the amounts of printing carried out.

The administrator can set a limit to use, on a function-by-function basis, a user-by-user basis, a user department-by-user department basis, and a used apparatus-by-used apparatus basis, via the user information management module 1031a and the apparatus information management module 1031b. Settable limit information includes the use fee, the number of pages, the number of sheets, and like items.

The use status input/output module 1031d monitors the set limits (limiting information) and the print history information (job information) for comparison, and when the use of a peripheral apparatus exceeds a limit, the use status input/output module 1031d outputs information indicative of the fact. The information may be output through display on a display device, or by E-mail or other communication means.

The job information management module 1031c monitors the limits (limiting information) set on a user-by-user basis and the print history information (job information) for comparison, and when the use by a specific user exceeds a limit set for the user, the job information management module 1031c instructs the client computer 1010 or an associated one of the peripheral apparatuses to refuse the use by the user. When the use by the specific user exceeds the limit set for the user, the user may be warned through display on the display device of the apparatus, or by E-mail or other communication means.

Figure 2:
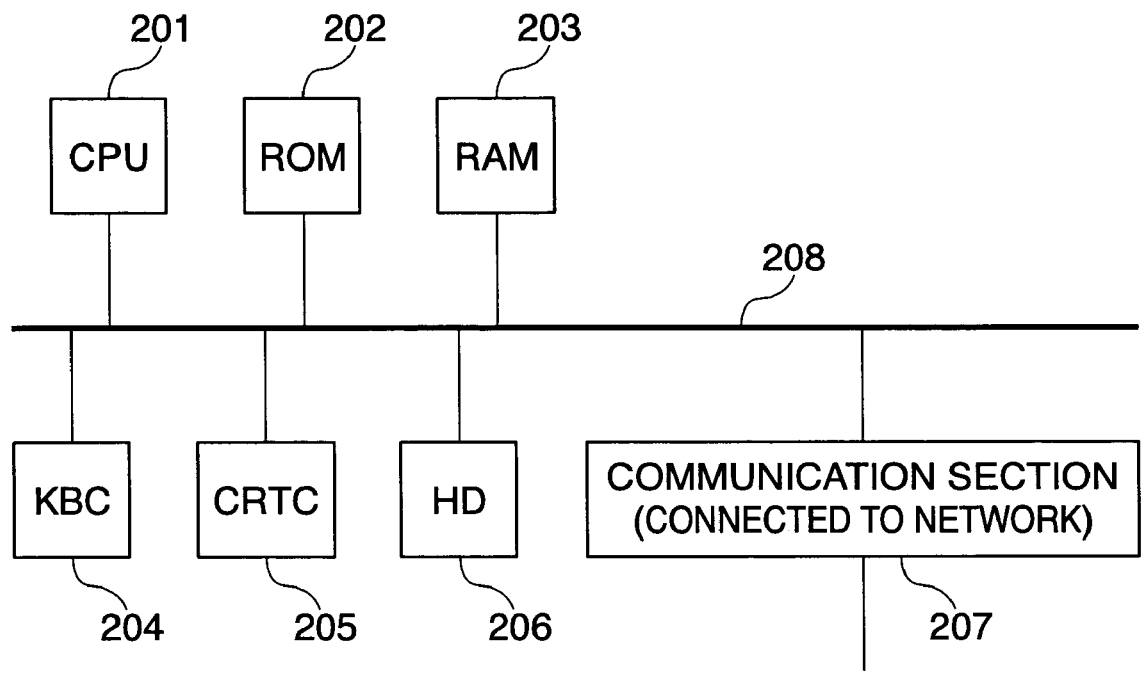
FIG. 2 is a block diagram showing the basic hardware configuration of a client computer and a base server computer appearing in FIG. 1.

FIG. 2 is a block diagram showing the basic hardware configuration of each of the client computers 1010 and 1020 and the base server computer 1030 in FIG. 1.

As shown in FIG. 2, each of the client computers 1010 and 1020 and the base server computer 1030 is comprised of a CPU (central processing unit) 201, a ROM (read-only memory) 202, a RAM (random access memory) 203, a KBC (keyboard control section) 204, a CRTC (display control section) 205, a HD (hard disk device) 206, a communication section 207, and a system bus 208.

The CPU 201 controls the overall operation of the apparatus (computer) and carries out arithmetic operations. The ROM 202 has a storage area for storing information on a system start-up program and the like. The RAM 203 has a data storage area which can be used freely.

The KBC 204 receives key-input data from a keyboard, not shown, attached to the apparatus and transfers the key-input data to the CPU 201. The CRTC 205 carries out display control of the display device, not shown. The HD 206 stores the OS, application programs, the device driver (printer driver), and a communication control program as well as data. These programs and data are loaded into the RAM 203 as required, and the loaded programs are executed by the CPU 201.

The HD 206 of the base server computer 1030 stores programs (job control programs) for carrying out processes described in detail hereinafter, as well as the user information, the apparatus information, and the job information (job history database). The HD 206 may be replaced by an external storage device, such as a removable disk device, a SRAM (nonvolatile storage memory) or a CD-ROM.

The communication section 207 controls network communications. The communication section 207 makes it possible to communicate with the other computers and the peripheral apparatuses connected to the network 1080. The system bus 208 connects between the component elements, such as the CPU 201 and the ROM 202, to enable data exchange. Although not shown, the client computer 1010 and the other information processing apparatuses are each provided with a pointing device, such as a mouse, as an operating section.

Figure 3:
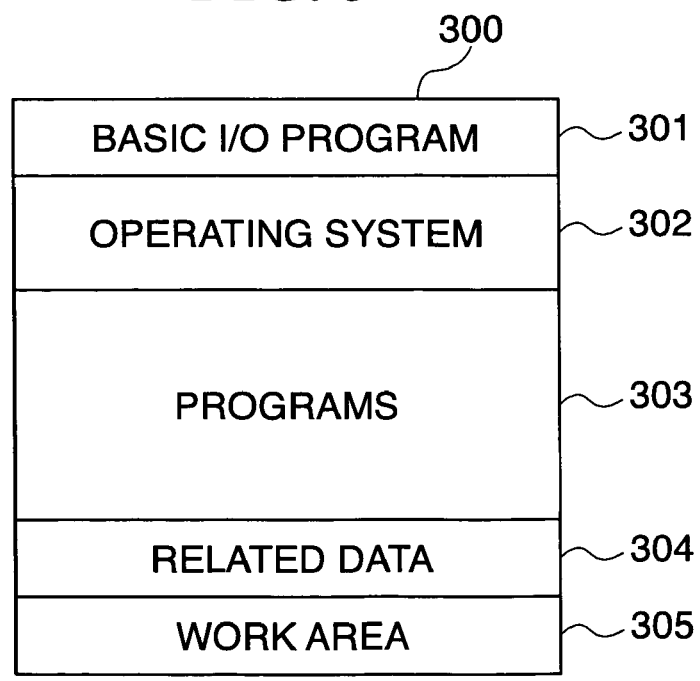
FIG. 3 is a diagram showing a memory map of programs and data loaded in a RAM appearing in FIG. 2.
Figure 4:
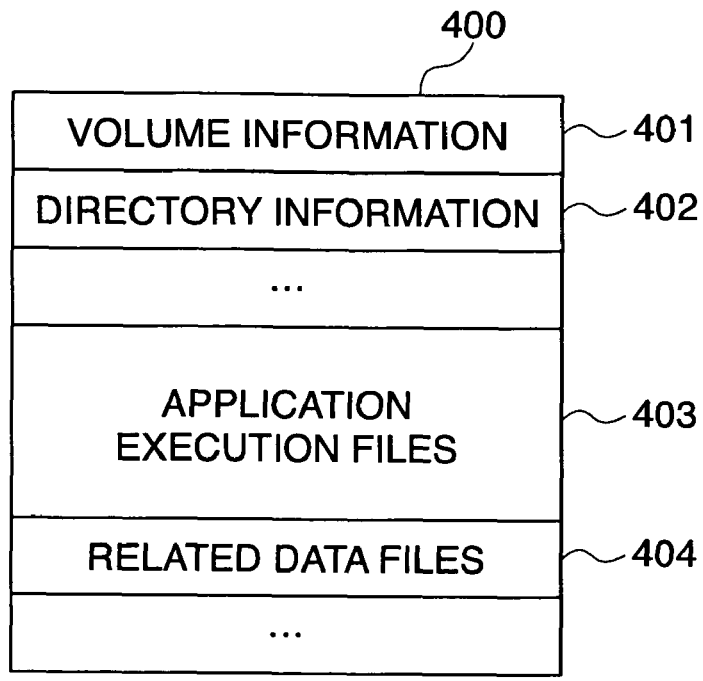
FIG. 4 is a diagram showing a memory map of programs and data stored in a HD appearing in FIG. 2.

Now, a memory map (storage area) 400 of the HD 206, the removable disk device, the CD-ROM or the like, which stores the program and related data is shown in FIG. 4, and a memory map 300 of the RAM 203 into which the application programs, data, and so forth are loaded from the HD 206 for execution by the CPU 201, is shown in FIG. 3.

As shown in FIG. 3, the memory map 300 is comprised of areas for storing a basic I/O program 301, an operating system 302, programs 303 including the job accounting client application 1014 and programs for the processes described hereinafter, related data 304, and a work area 305 used by the CPU 201 for executing the programs 303 and the like.

As shown in FIG. 4, the memory map 400 is comprised of areas for storing volume information 401, directory information 402, application execution files 403 for the job accounting client application 1014 and the like, and a job accounting-related data file 404.

Figure 5:
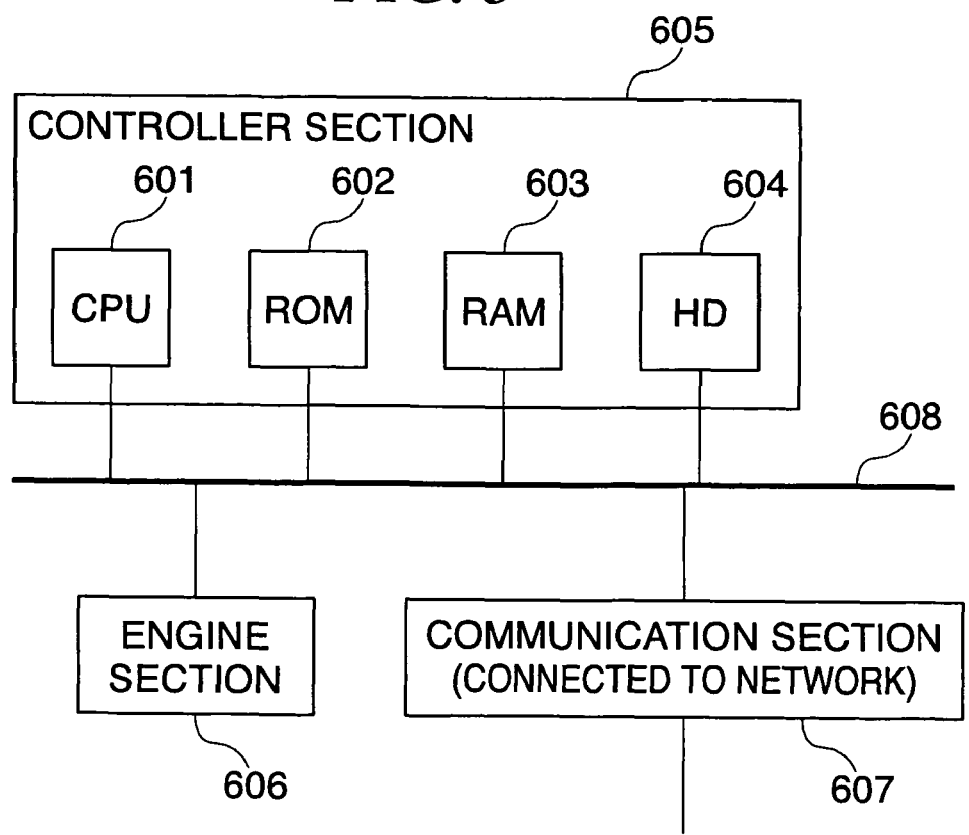
FIG. 5 is a block diagram showing the basic hardware configuration of peripheral apparatuses appearing in FIG. 1.

FIG. 5 is a block diagram showing the basic hardware configuration of each of the peripheral apparatuses appearing in FIG. 1.

As shown in FIG. 5, each of the printers 1040 and 1060 and the MFP 1050 as peripheral apparatuses basically includes hardware comprised of a controller section 605, an engine section 606, a communication section 607, and a system bus 608. The controller section 605 is comprised of a CPU 601, a ROM 602, a RAM 603, and a HD 604. The controller section 605 controls the overall operation of the peripheral apparatus.

The CPU 601 controls the controller section 605 and the overall operation of the peripheral apparatus, and carries out arithmetic operations. The ROM 602 is a read-only memory, and has a storage area storing the system start-up program and the like. The RAM 603 is a random access memory, and has a data storage area. The HD 604 is implemented by a hard disk device, and may be replaced by another nonvolatile storage device, such as a SRAM.

Each of the printer 1040 and the MFP 1050 having the job history storing function stores job history information in the RAM 603 or the HD 604. Further, the operating system, the communication control program, and an engine control program are loaded into the RAM 603 and executed by the CPU 601.

More specifically, the engine section 606 is formed by a printer engine and/or a scanner engine. The engine section 606 performs a printing operation and an image scanning operation under the control of the controller section 605. The communication section 607 controls network communications. The communication section 607 enables the peripheral apparatus to communicate with the client computer 1010 and the base server computer 1030. The system bus 608 connects between the component elements including the CPU 601, for data exchange.

Figure 6:
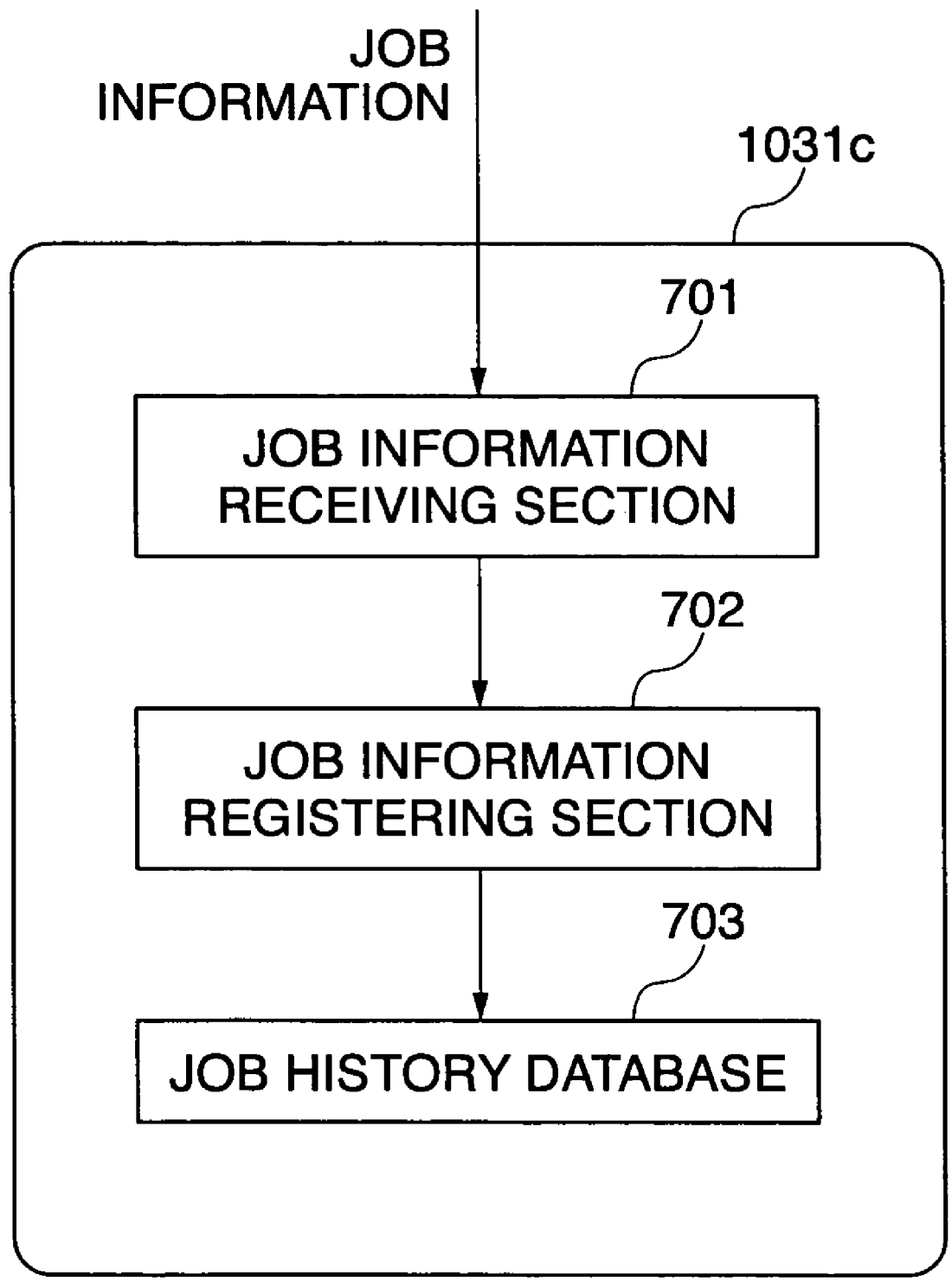
FIG. 6 is a block diagram showing the functional configuration of a job information management module appearing in FIG. 1.

FIG. 6 is a block diagram showing the functional configuration of the job information management module 1031*c* appearing in FIG. 1.

As shown in FIG. 6, the job information management module 1031*c* is comprised of a job information receiving section 701, a job information registering section 702, and a job history database 703.

The job information receiving section 701 receives job information from the job accounting client applications 1014 and 1024, and the printer 1040 and the MFP 1050 having the job history storing function, via the network 1080. The job information registering section 702 registers the job information received by the job information receiving section 701 in the job history database 703.

By referring to data stored in the job history database 703, what kind of job (a print job, a copy job, or a FAX job) was carried out, when, by whom and in how much amount (the number of pages, the number of discharged sheets, or the type of the sheets) using which peripheral apparatus is determined, and hence detailed job accounting is carried out.

Next, a description will be given, with reference to FIG. 7, of a job information registration process executed by the job information registering section 702 so as to register job information received by the job information receiving section 701 in the job history database 703.

Figure 7:
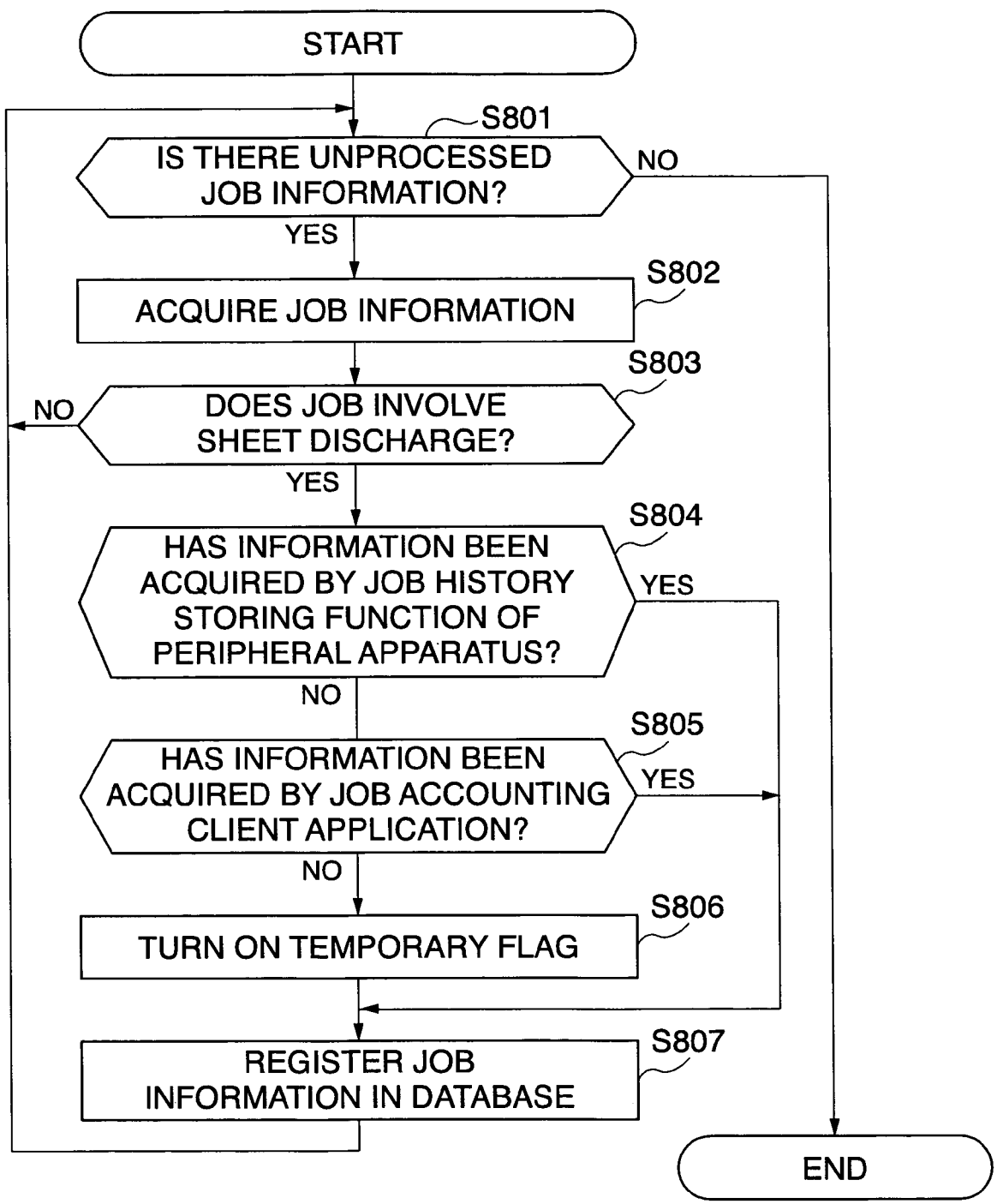
FIG. 7 is a flowchart of a job information registration process executed by a job information registering section appearing in FIG. 6.

FIG. 7 is a flowchart of the job information registration process executed by the job information registering section 702 in FIG. 6.

As shown in FIG. 7, first, the job information registering section 702 determines whether or not there is any unprocessed job information in the job information receiving section 701 (step S801). If there is no unprocessed job information (NO to the step S801), the present process is immediately terminated. On the other hand, if there is unprocessed job information (YES to the S801), the job information registering section 702 acquires the job information from the job information receiving section 701 (step S802).

Then, the job information registering section 702 determines in a step S803 whether or not the acquired job information is on a job involving sheet discharge. If the job information is not on a job involving sheet discharge (NO to the step S803), the process returns to the step S801. On the other hand, if the job information is on a job involving sheet discharge, the process proceeds to a step S804. The step S804 to a step S807 are executed so as to register the job information in the job history database 703.

First, in the step S804, the job information registering section 702 determines whether or not the job information has been acquired using the job history storing function of the peripheral apparatus. If the job information has been acquired using the job history storing function of the peripheral apparatus (YES to the step S804), there is no possibility of duplicate registration of the job information, the process proceeds to the step S807. In the step S807, the job information is registered in the job history database 703, followed by the process returning to the step S801. At the time of registration of the job information, a search is performed using a job ID to find out whether or not the job information has already been registered as temporary job information (job history). If the job information has been registered as the temporary job information, a temporary flag indicating that the job information is temporary job information is turned off, and then the job information is registered anew. On the other hand, if the job information has not been registered as temporary job information, the job information is newly registered.

If it is determined in the step S804 that the job information has not been acquired using the job history storing function of the peripheral apparatus (NO to the step S804), the job information registering section 702 determines whether or not the job information has been acquired by the job accounting client application 1014 (1024) (step S805). If it is determined that the job information has been acquired by the job accounting client application 1014 (1024) (YES to the step S805), there is no possibility of duplicate registration of the job information, and therefore the process proceeds to the step S807, wherein the job information is registered.

On the other hand, if the job information has not been acquired by the job accounting client application 1014 (1024) (NO to the step S805), the temporary flag in the job information is turned on to indicate that the job information is temporary job information (job history) (step S806), and then the process proceeds to the step S807, wherein the job information is registered.

FIG. 8 is a diagram showing an example of job information registered in the job history database 703 in FIG. 6.

As shown in FIG. 8, the job history database 703 is comprised of items and the contents of the items. Reference numeral 901 designates an output device that outputs job information, i.e. a peripheral apparatus by which the acquired job information was processed. When the job information is on a job not involving sheet discharge, a file name (indicating scanning of an original), information indicative of facsimile transmission, or information indicative of another job not involving sheet discharge is registered. Reference 902 designates a method in which the job information was acquired. Methods of acquiring job information include acquisition by hooking, acquisition from a spooler, and acquisition from the job history storing function (apparatus job history).

Reference numeral 903 designates the start time or end time of the executed job, 904 the type of discharged sheets, 905 the number of output pages, 906 the number of the discharged sheets, 907 whether or not the job information has been input to the printer 1040 or the like which is shared for use by the client computer 1010 and the like, 908 the user name of an issuer who issued the job information, 909 information indicative of whether the job information is for a color printing mode or for a monochrome printing mode, 910 the document name of a printed document, 911 information indicative of whether the job information is for one-sided printing or for double-sided printing, 912 N in 1 print information for specifying the number of pages of information to be printed on one face of each sheet, and 913 the temporary flag for indicating whether the job information provides a temporary history (the temporary flag is on) or a final history (the temporary flag is off).

Next, a description will be given, with reference to FIGS. 9A to 11, of a port monitor replacement process as an essential feature of the present embodiment, which is executed immediately after installation of the job accounting client application 1014 in the client computer 1010 in which the second port monitor 1016 has not been set, i.e. a process for switching the output destination of the printer driver 1015 from the port monitored by the first port monitor 1017 preset to a port as the output destination of the printer driver 1015 to the port monitored by the second port monitor 1016 dedicated to the job accounting system.

Figure 9B:
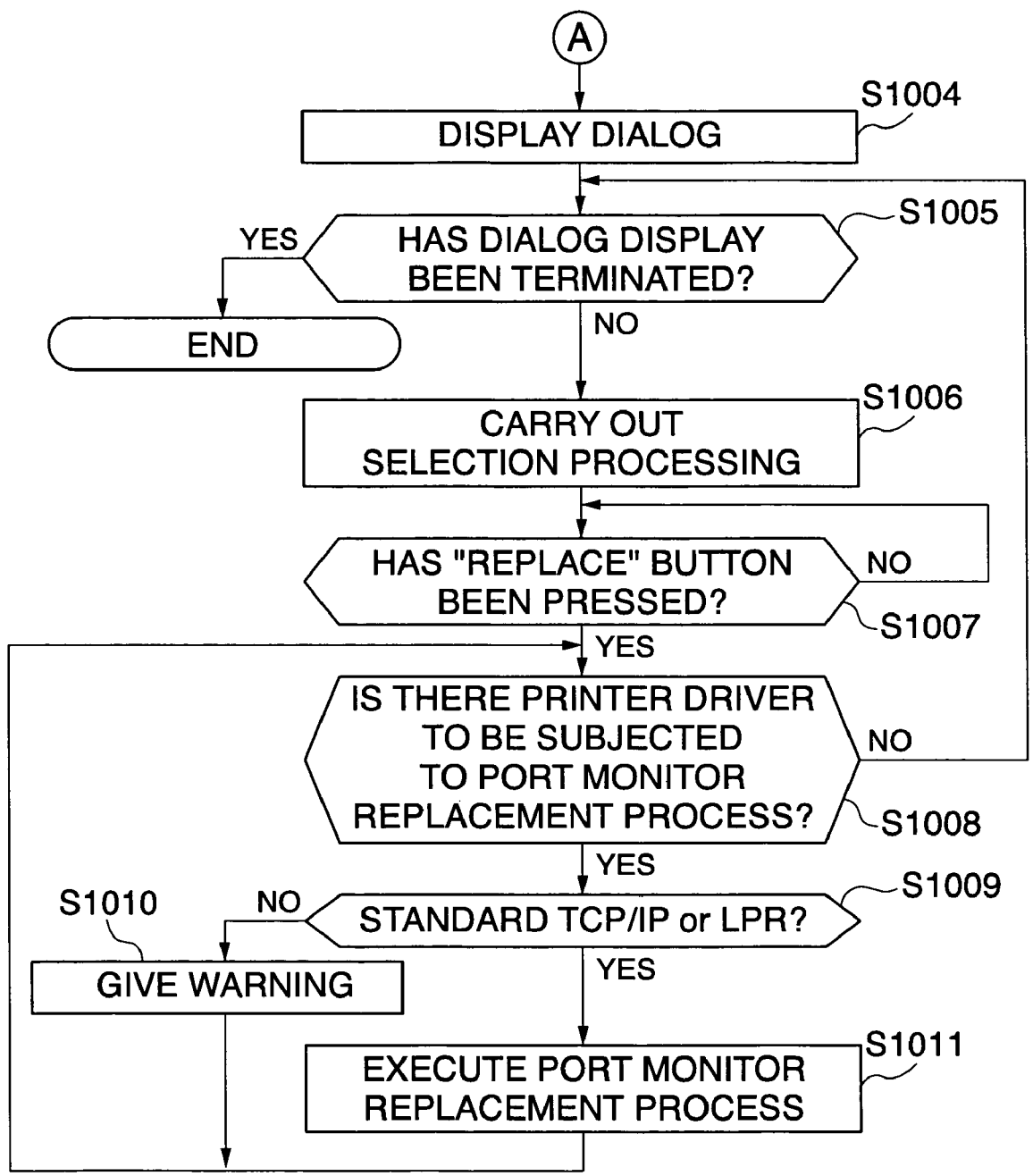

FIGS. 9A and 9B are flowcharts of the port monitor replacement process for switching the output destination of the device driver to the port monitored by the second port monitor 1016, which is executed to construct a system for acquiring job information using the second port monitor 1016, i.e. immediately after installation of the job accounting client application 1014 and the second port monitor 1016 in the client computer 1010. Although in the following process, a standard port (a port monitored by the first port monitor 1017) to be switched to the port monitored by the second port monitor is a port monitored by a "Standard TCP/IP" port monitor or a "LPR" port monitor, this is not limitative, but ports monitored by other types of port monitors may be switched to the port monitored by the second port monitor 1016.

As shown in FIG. 9A, in a step S1001, installation of the job accounting client application 1014 and the second port monitor 1016 is carried out. This software module installation process is known, and therefore description thereof is omitted. When the installation process is executed, each module, not shown, of the job accounting client application 1014 and the second port monitor 1016 is copied into a predetermined folder on the OS, and rewriting of the OS registry is carried out for program registration.

Next, in a step S1002, the installed modules, i.e. the job accounting client application 1014 and the second port monitor 1016 check printer information stored in the client computer 1010. More specifically, the job accounting client application 1014 issues a known API called "EnumPrinters" to the OS and receives the return value of the API therefrom, thereby acquiring the name (printer name) of a printer driver already installed in the client computer 1010.

Further, the job accounting client application 1014 issues a known API called "EnumPorts" to thereby acquire the settings of a port monitor for monitoring a port as the output destination of a printer driver installed in the client computer 1010. If a plurality of printer drivers are installed at this time, the settings of a port monitor (corresponding to the first port monitor) of each printer driver for monitoring the port is acquired.

Then, in a step S1003, a dialog screen, not shown, is displayed on the display device by the CRTC 205, for determination as to whether or not a silent mode has been selected. More specifically, it is determined whether a silent mode for automatically carrying out the port monitor replacement process for the port monitors of all the printer drivers installed in the client computer 1010 has been selected, or the silent mode has not been selected but printer drivers installed in the client computer 1010 are to be individually subjected to the port monitor replacement process. If the silent mode has not been selected (NO to the step S1003), a dialog screen for carrying out the port monitor replacement process shown in FIG. 10 is displayed on the display device of the client computer 1010 in a step S1004.

Figure 10:
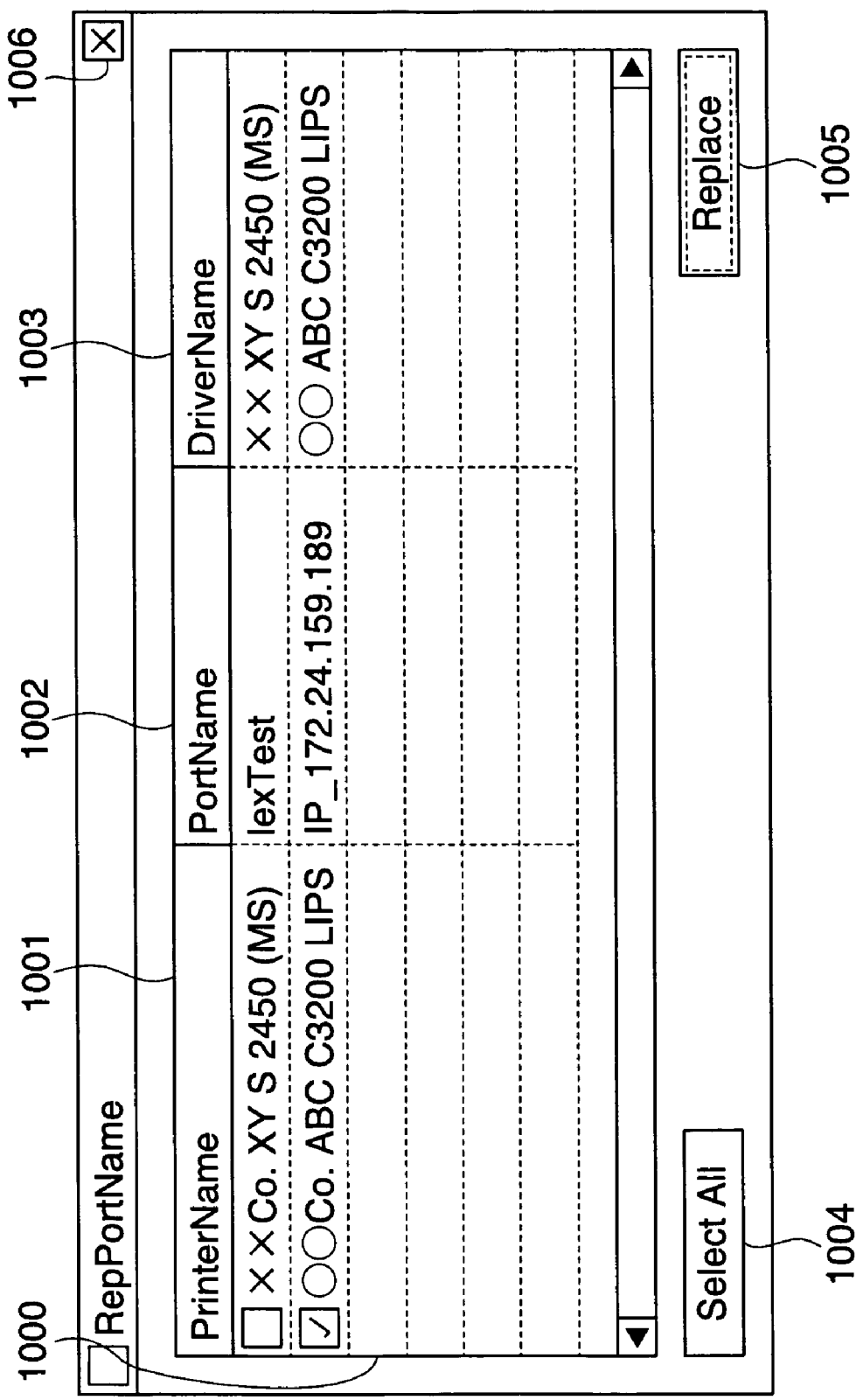
FIG. 10 is a diagram showing an example of a GUI for carrying out the port monitor replacement process in FIGS. 9A and 9B.

FIG. 10 is a diagram showing an example of a GUI for carrying out the port monitor replacement process in FIGS. 9A and 9B.

As shown in FIG. 10, in a list box 1000, there are listed printer names 1001, port names 1002, and printer driver names 1003, of the printer drivers currently installed in the client computer 1010. After individually checking a selected one of checkboxes provided at the heads of the respective printer names 1001 or pressing a "Select All" button 1004 to select all the checkboxes, a "Replace" button 1005 is pressed, and then the port monitor replacement process is executed to switch the port monitored by the port monitor of each printer driver to the port monitored by the port monitor dedicated to the job accounting system.

Referring again to FIG. 9B, if termination of display of the dialog is selected, i.e., a button 1006 in FIG. 10 is pressed to terminate display of the dialog in a step S1005, the present process is terminated, whereas if the termination of display of the dialog is not selected, selection processing for selecting a printer (printer driver) to be subjected to the port monitor replacement process is carried out in a step S1006. In this step, a user instruction issued by individually checking a selected checkbox in the list box 1000 or pressing the "Select All" button 1004 to bring all the checkboxes into the selected state, as described hereinabove, is accepted.

Then, if the "Replace" button (change button) 1005 is pressed in a step S1007 (YES to the step S1007), it is determined in a step S1008 whether or not there is any printer driver among the printer drivers of the respective printers selected in the step S1006, which has not undergone the port monitor replacement process, i.e. whether or not there is any printer driver to be subjected to the port monitor replacement process. If there is no printer driver to be subjected to the port monitor replacement process (NO to the step S1008), the process returns to the step S1005, whereas if there is any printer driver to be subjected to the port monitor replacement process (YES to the step S1008), the process proceeds to a step S1009.

In the step S1009, it is determined whether or not the port as the output destination of the printer driver to be subjected to the port monitor replacement process is a port monitored by a port monitor of a predetermined type for standard use, more specifically whether or not the port is either a "Standard TCP/IP" port or a "LPR" port. This determination can be made by checking the settings of the port as the output destination of the printer driver, which was acquired by issuing the "EnumPorts" in the step S1002.

If it is determined in the step S1009 that the port as the output destination of the printer driver to be subjected to the port monitor replacement process is a different type from the port (the "Standard TCP/IP" port or the "LPR" port) (NO to the step S1009), a warning dialog 1101 to the effect that port monitor replacement should not be carried out is displayed, as shown in FIG. 11, on the display device in a step S1010, followed by the process returning to the step S1008.

On the other hand, if the port as the output destination of the printer driver to be subjected to the port monitor replacement process is either a "Standard TCP/IP" port or a "LPR" port (YES to the step S1009), the port monitor replacement process for switching the monitored port to a port monitored by the port monitor (second port monitor) dedicated to the job accounting system is executed in a step S1011, followed by the process returning to the step S1008.

If the silent mode has been selected in the step S1003 (YES to the step S1003), it is determined in a step S1012 whether or not there is any printer driver among all the printer drivers already installed in the client computer 1010, which has not undergone the port monitor replacement process, i.e. whether or not there is any printer driver to be subjected to the port monitor replacement process.

If it is determined in the step S1012 that there is no printer driver to be subjected to the port monitor replacement process (NO to the step S1012), the present process is immediately terminated. On the other hand, if there is any printer driver to be subjected to the port monitor replacement process (YES to the step S1012), it is determined in a step S1013 whether or the port as the output destination of the printer driver to be subjected to the port monitor replacement process is either a "Standard TCP/IP" port or a "LPR" port. If the port as the output destination of the printer driver to be subjected to the port monitor replacement process is a different type from the port (the "Standard TCP/IP" port or the "LPR" port) (NO to the step S1013), the warning dialog 1101 to the effect that port monitor replacement should not be carried out is displayed on the display device in a step S1014, followed by the process returning to the step S1012.

On the other hand, if the port as the output destination of the printer driver to be subjected to the port monitor replacement process is either the "Standard TCP/IP" port or the "LPR" port (YES to the step S1013), the port monitor replacement process for switching the monitored port to a port monitored by the port monitor (second port monitor) dedicated to the job accounting system is executed in a step S1015, followed by the process returning to the step S1012.

According to the first embodiment described above, the job accounting client application 1014 installed in the client computer 1010 in which the second port monitor 1016 has not been set checks the printers (printer drivers) installed in the client computer 1010 (step S1002), and identifies a printer driver which has not undergone the port monitor replacement process from among all the printer drivers already installed (step S1012). If the port as the output destination of the identified printer driver is either a "Standard TCP/IP" port or a "LPR" port (YES to the step S1012), the port is switched to a port monitored by the second port monitor dedicated to the job accounting system. As a result, when the job accounting system is introduced into a network on which a plurality of peripheral apparatuses are shared, the administrator of the system and the users of respective client computers under job management do not need to carry out operations for switching the ports as the output destinations of printer drivers installed in an associated client computer to the port monitored by the port monitor dedicated to the job accounting system, which makes it possible to reduce a burden on the administrator and the users, thereby enabling efficient introduction of the job accounting system as well as efficient job management.

Next, a second embodiment of the present invention will be described. The second embodiment is identical in configuration (FIGS. 1 to 6) to the above described first embodiment, and therefore description of the configuration thereof is omitted.

According to the present embodiment, the base server computer 1030 instructs the client computer 1010 to carry out the port monitor replacement. In the following, a description will be given of a port monitor replacement process executed by the client computer 1010 in response to the instruction from the base server computer 1030, with reference to FIGS. 12 to 14.

FIG. 12 is a diagram showing an example of user management information stored in the D/B 1090 within the base server computer 1030.

In the job accounting system of the present embodiment, the base server computer 1030 as a job management apparatus manages the monitoring of ports as the output destinations of the printer drivers of the respective client computers on a user-by-user basis (i.e. separately e.g. for a client user A, a client user B, . . . ) based on the user management information shown in FIG. 12.

As shown in FIG. 12, the user management information is stored in the D/B 1090 and managed for each of the users of the respective client computers. Reference numeral 1501 designates the module version of a job accounting client application (JACA). Reference numeral 1502 designates a printer name (printer driver name) registered for each client user, such as the client computer 1010. Reference numeral 1503 designates information on a port as an output destination set in the printer driver of each client computer.

Figure 13:
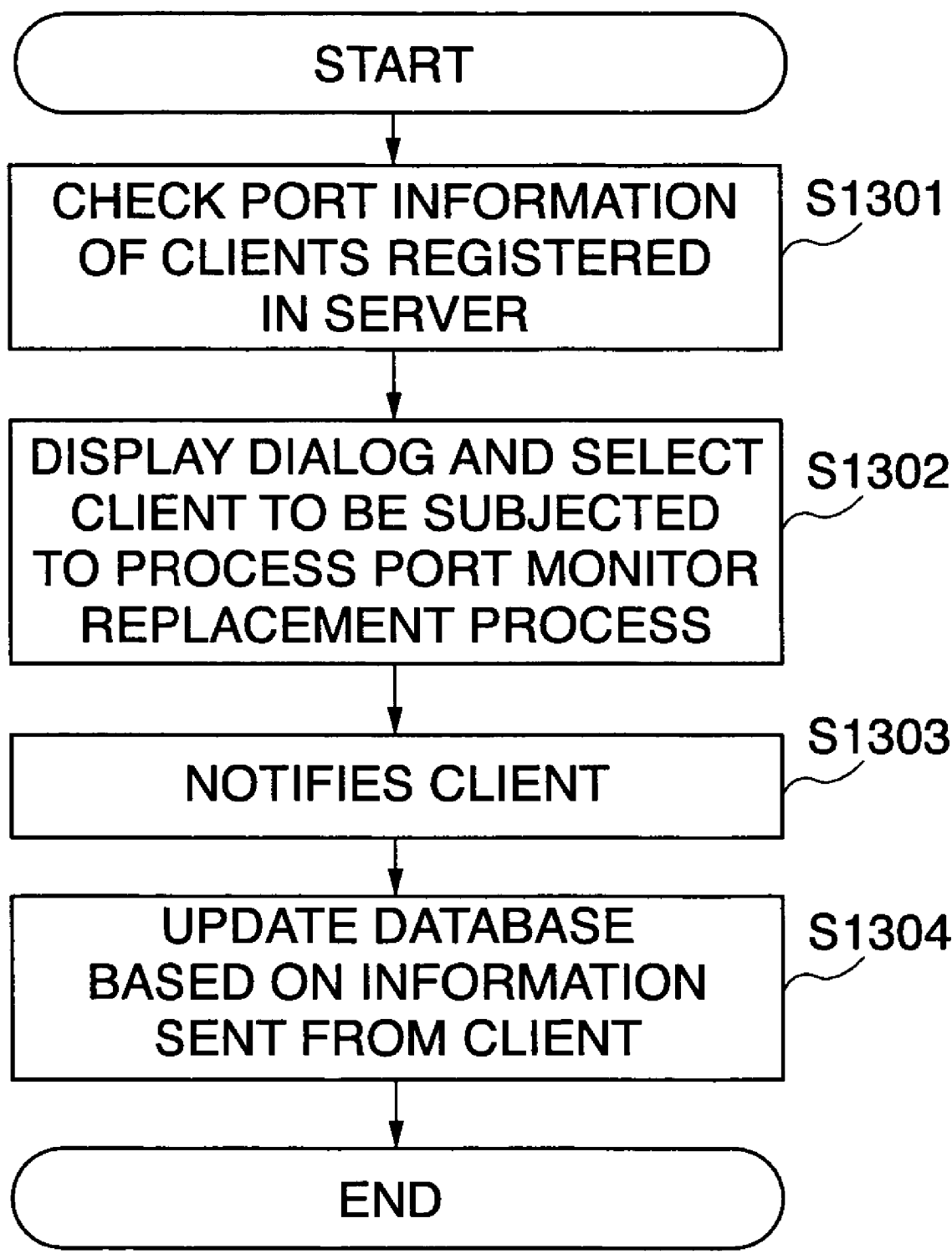
FIG. 13 is a flowchart of a notification process executed by the base server computer for instructing a client computer to carry out port monitor replacement.

FIG. 13 is a flowchart of a notification process executed by the base server computer 1030 for instructing the client computer 1010 to carry out port monitor replacement.

As shown in FIG. 13, in a step S1301, the job accounting server application 1031 in the base server computer 1030 checks information on the ports of client computers already registered in the base server computer 1030. More specifically, the job accounting server application 1031 refers to the user management information stored in the D/B 1090.

Next, in a step S1302, a dialog screen based on the user management information is displayed on the display device by the CRTC 205 of the base server computer 1030 so as to receive selection of a client computer to be subjected to the port monitor replacement, from the administrator of the base server computer 1030.

Then, if the client computer 1010 is selected in the step S1302, the base server computer 1030 instructs the client computer 1010 to carry out the port monitor replacement (step 1303). Next, in a step S1304, the user management information stored in the D/B 1090 is updated based on information sent from the client computer 1010 in a step S1107 in FIG. 14, described hereinafter, followed by terminating the present process.

Figure 14:
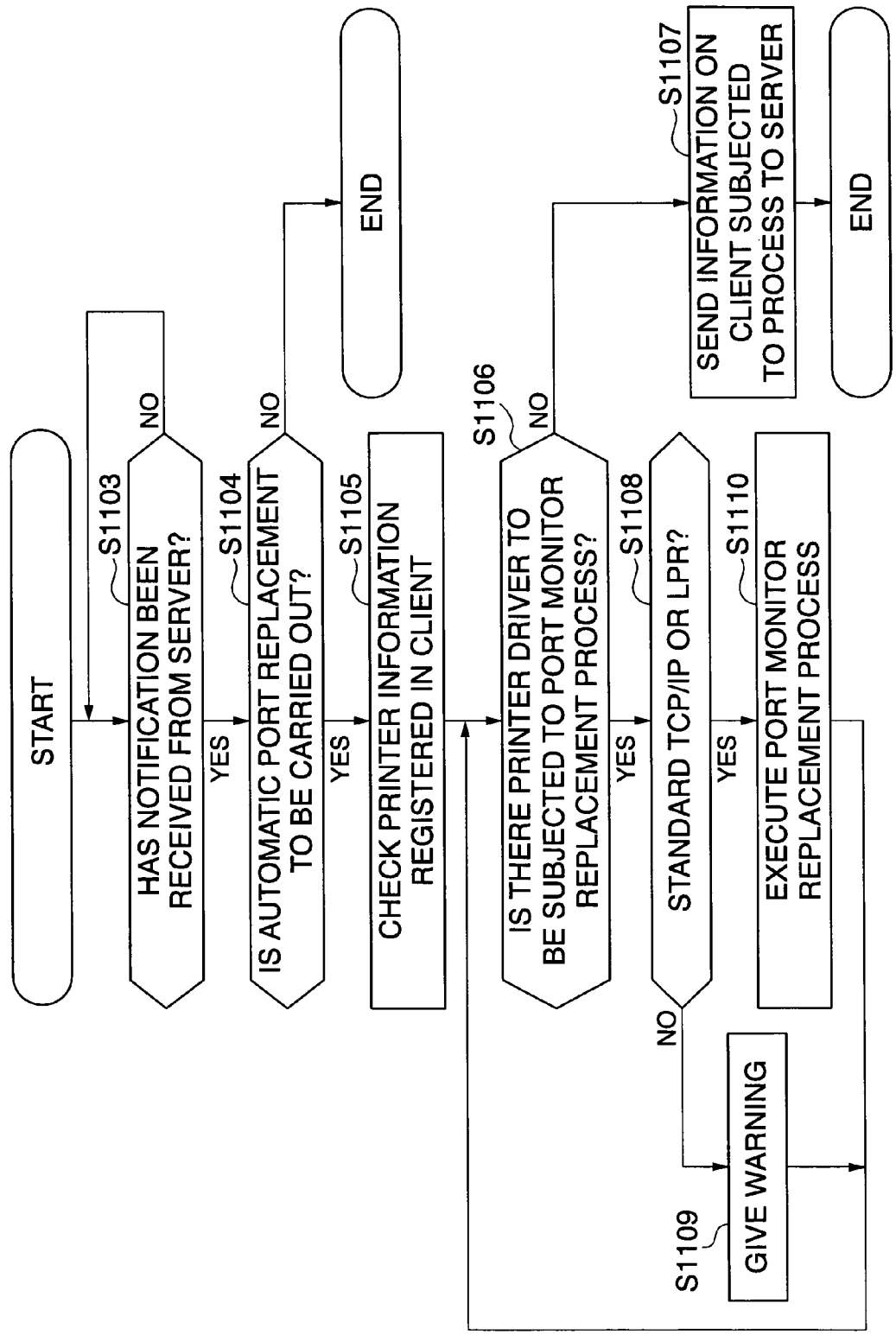
FIG. 14 is a flowchart of a port monitor replacement process.
Figure 15:
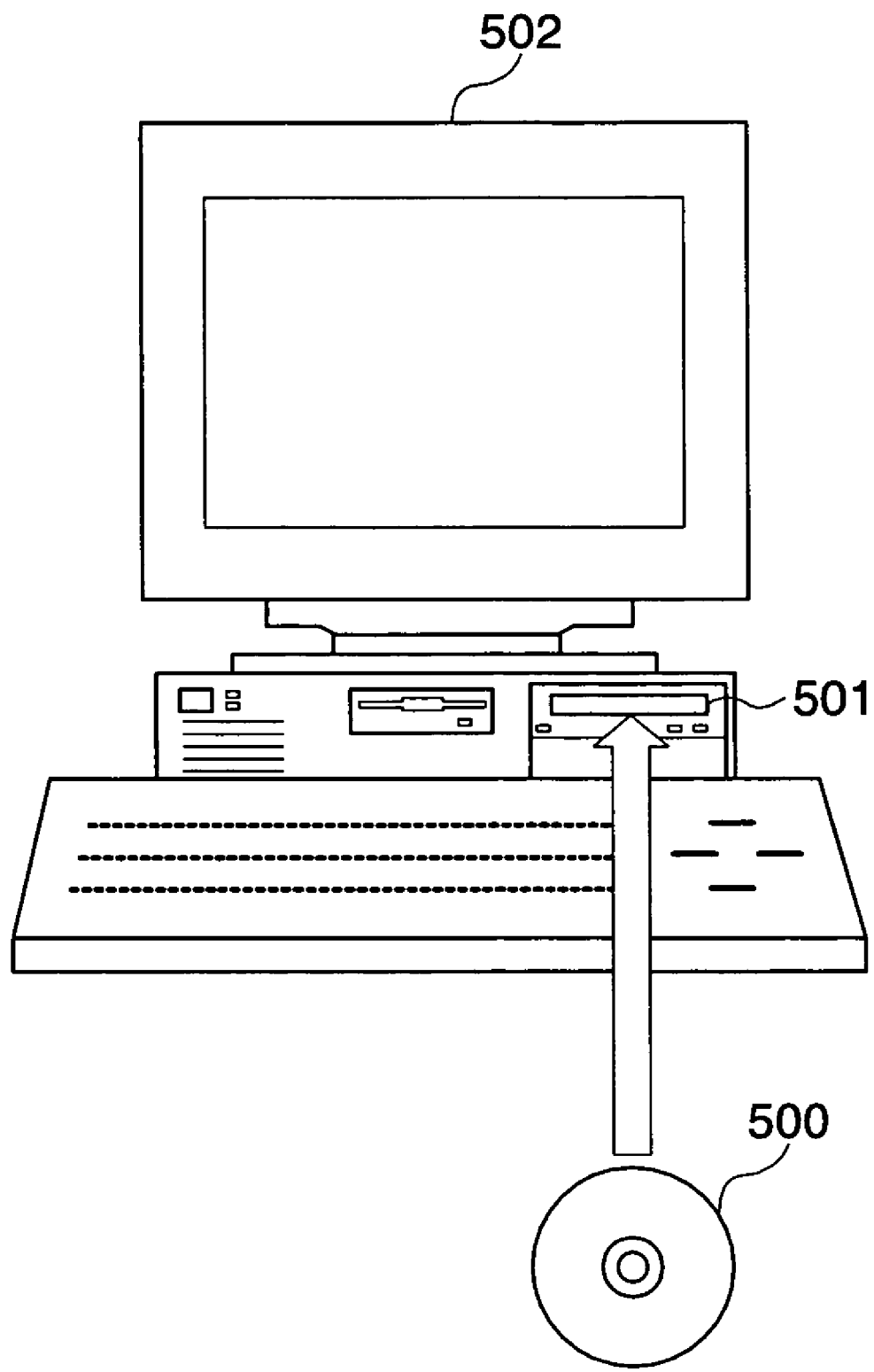
FIG. 15 is a view useful in explaining a method of supplying a computer with the programs and the data shown in FIG. 4.
Figure 16:
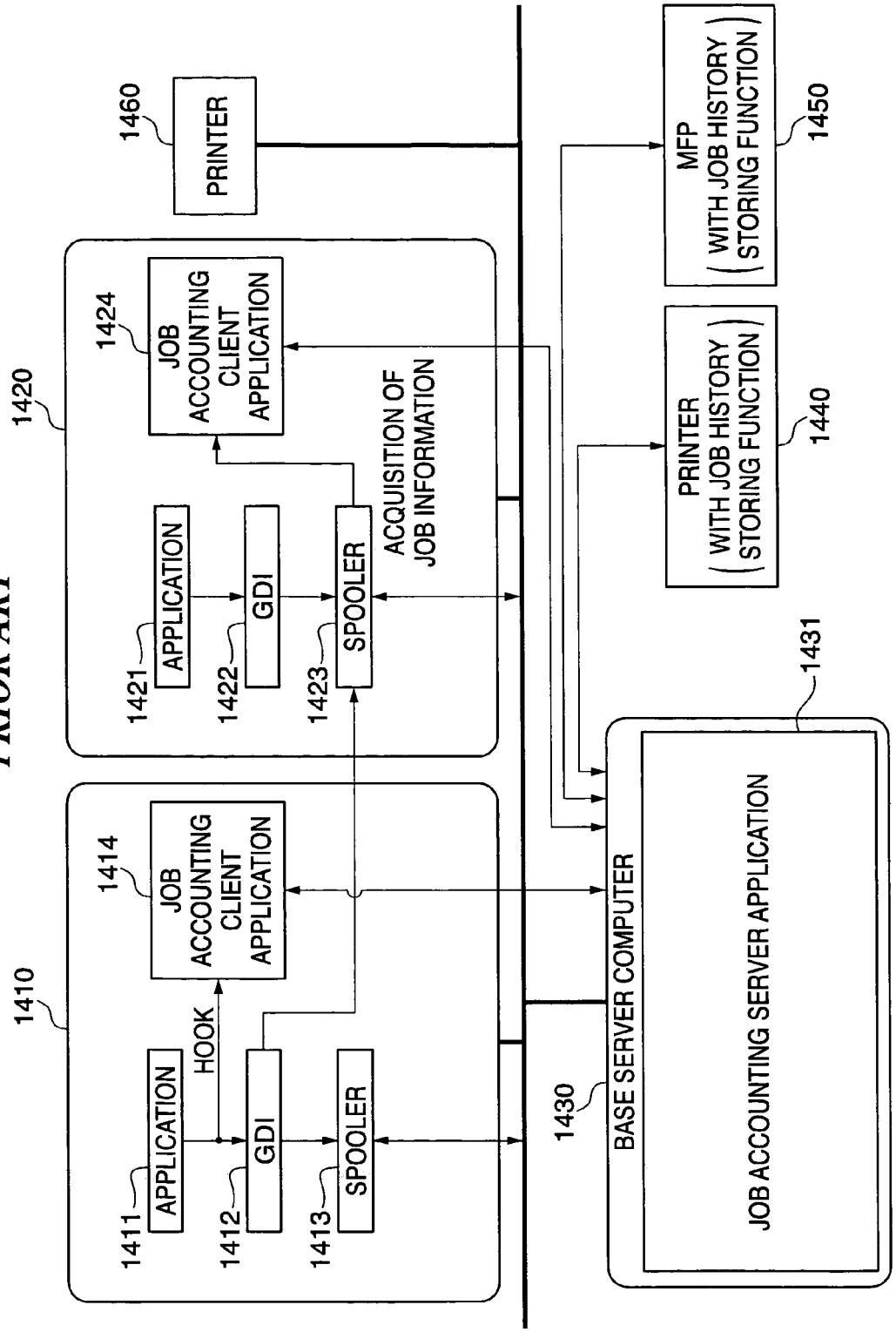
FIG. 16 is a diagram showing the configuration of a conventional job accounting system.

FIG. 14 is a flowchart of the port monitor replacement process executed by the client computer 1010.

As shown in FIG. 14, the job accounting client application 1014 in the client computer 1010 determines in a step S1103 whether or not an instruction has been received from the base server computer 1030. If no instruction has been received (NO to the step S1103), the determination step is periodically repeated. On the other hand, if an instruction has been received (YES to the step S1103), the process proceeds to a step S1104, wherein a dialog screen, not shown, is displayed on the display device of the client computer 1010 so that the user can select whether or not automatic port monitor replacement should be carried out. If the user instructs the client computer 1010 via the displayed dialog screen not to carry out the automatic port monitor replacement (NO to the step S1104), the present process is immediately terminated, whereas if the user instructs the client computer 1010 to carry out the automatic port monitor replacement (YES to the step S1104), the process proceeds to a step S1105.

In the step S1105, as in the step S1002 in FIG. 9A, the job accounting client application 1014 checks printer information already registered in the client computer 1010. Then, it is determined in a step S1106 whether or not there is any printer driver among all the printer drivers already installed in the client computer 1010, which has not undergone the port monitor replacement process, i.e. whether or not there is any printer driver to be subjected to the port monitor replacement process.

If it is determined in the step S1106 that there is a printer driver to be subjected to the port monitor replacement process (YES to the step S1106), it is determined in a step S1108 whether or not the port as the output destination of the printer driver to be subjected to the port monitor replacement process is either a "Standard TCP/IP" port or a "LPR" port. If the port as the output destination of the printer driver to be subjected to the port monitor replacement process is a different type from the port (the "Standard TCP/IP" port or the "LPR" port) (NO to the step S1108), the warning dialog 1101 to the effect that port monitor replacement should not be carried out is displayed on the display device in a step S1109, followed by the process returning to the step S1106.

On the other hand, if the port as the output destination of the printer driver to be subjected to the port monitor replacement process is either the "Standard TCP/IP" port or the "LPR" port (YES to the step S1108), the port monitor replacement process for switching the monitored port to a port monitored by the port monitor (second port monitor) dedicated to the job accounting system is executed in a step S1110, followed by the process returning to the step S1106.

If it is determined in the step S1106 that all the printer drivers selected for the port monitor replacement process have undergone the process (NO to the step S1106), information on the newly set port monitors is sent to the base server computer 1030 (step S1107), followed by terminating the present process.

According to the present embodiment, the base server computer 1030 instructs the client computer 1010 selected by the administrator to carry out the port monitor replacement (step S1303 in FIG. 13), and the client computer 1010 executes the port monitor replacement process in response to the instruction from the base server computer 1030. Therefore, when the job accounting system is introduced into a network on which a plurality of peripheral apparatuses are shared, it is possible to reduce a burden on the administrator of the system and the users of a plurality of client computers under job management, thereby enabling efficient introduction of the job accounting system as well as efficient job management.

Although in the present embodiment, the port monitor replacement process is executed by the client computer 1010 when the base server computer 1030 instructs the client computer 1010 to carry out the port monitor replacement, the port monitor replacement process may be executed immediately after installation of the job accounting client application 1014, as described before with reference to the first embodiment.

It is to be understood that the object of the present invention may also be accomplished by supplying a computer or a CPU with a program code of software, which realizes the functions of either of the above described embodiments, and causing the computer or CPU to read out and execute the program code.

The above program has only to realize the functions of either of the above described embodiments on a computer, and the form of the program may be an object code, a program code executed by an interpreter, or script data supplied to an OS.

Further, it is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

The present invention is not limited to the above described embodiments, but can be modified in various manners based on the subject matter of the present invention, which should not be excluded from within the scope of the present invention insofar as functions as recited in the appended claims or the functions performed by the construction of either of the above described embodiments can be achieved.

As many apparently widely different embodiments of the present invention can be made without departing from the spirit and scope thereof, it is to be understood that the invention is not limited to the specific embodiments thereof except as defined in the appended claims.

CROSS REFERENCE TO RELATED APPLICATION

This application claims priority from Japanese Patent Application No. 2004-100620 filed Mar. 30, 2004, which is hereby incorporated by reference herein.

What is claimed is:

1. An information processing apparatus connected to a plurality of peripheral apparatuses and having a plurality of device drivers installed therein for generating respective output jobs, each output job to be output to at least one of the peripheral apparatuses, the information processing apparatus comprising:
    a first port monitor that, for each of the plurality of device drivers, is preset to monitor a port as an output destination of the corresponding device driver, receives the corresponding output job generated by the corresponding device driver, and delivers the corresponding output job to at least one of the peripheral apparatuses, wherein the respective ports monitored by said first port monitor for each of the plurality of device drivers are set in advance by an operation system installed in the information processing apparatus or are LPR ports;
    a second port monitor that, for each of the plurality of device drivers, receives the corresponding output job generated by the corresponding device driver and delivers the corresponding output job to at least one of the peripheral apparatuses, said second port monitor collecting job information including setting information on each of the output jobs;
    a selection device that allows selection of device drivers for which the respective port as the output destination thereof is to be switched, the selection occurring from the plurality of device drivers installed in the information processing apparatus; and
    a switching device that is operable when a system, which is for accounting the output jobs by using the job information collected by said second port monitor, is constructed, to switch the port set correspondingly to each of the plurality of device drivers selected via the selection device from the port monitored by the first port monitor to a port monitored by said second port monitor,
    wherein said second port monitor, which is different from said first port monitor, is dedicated to the system, and
    wherein said switching device is operable to switch the respective ports for the plurality of the device drivers synchronously.

2. An information processing apparatus as claimed in claim 1,
    wherein said switching device comprises a determining device that determines a port associated with each of at least some of the plurality of device drivers, and
    wherein the selecting device displays, for each of the device drivers determined by said determining device, a name of the associated port and a name of the associated device driver, and allows selection of device drivers from the displayed names of device drivers.

3. An information processing apparatus as claimed in claim 1, further comprising a judging device that is operable when the system for accounting the output jobs is constructed, to judge whether the switching by said switching device should be carried out either in response to a selection instruction from a user or automatically.

4. An information processing apparatus as claimed in claim 1, wherein when the system for accounting the output jobs is constructed, said switching device determines whether or not the first port monitor is of a predetermined type, and if the first port monitor is of the predetermined type, performs the switching, whereas if the first port monitor is not of the predetermined type, displays a warning.

5. An information processing apparatus as claimed in claim 1, further comprising a job information collecting device that collects the job information via an application program interface and delivers the collected job information to another information processing apparatus, and wherein said second port monitor notifies said job information collecting device of the receipt of the output job, when the output job is received.

6. An information processing apparatus as claimed in claim 1, wherein the peripheral apparatuses include a printer, a copying machine, and a scanner.

7. An information processing method for an information processing apparatus that has a plurality of device drivers installed therein for generating respective output jobs, each output job to be output to at least one of a plurality of peripheral apparatuses, the information processing apparatus configured to output each of the output jobs to at least one of the peripheral apparatuses via (a) a first port monitor that, for each of the plurality of device drivers, is preset to monitor a port as an output destination of the corresponding device driver, or (b) a second port monitor that monitors a port that can be set as a port for each of the plurality of device drivers, the respective ports monitored by the first port monitor for each of the plurality of device drivers are set in advance by an operation system installed in the information processing apparatus or are LPR ports, the information processing method comprising:
    an outputting and collecting step of, for each of the plurality of device drivers, receiving the corresponding output job generated by the corresponding device driver, delivering the corresponding output job to at least one of the peripheral apparatuses, and collecting job information including setting information on each of the output jobs, using the second port monitor;
    a selection step of allowing selection of device drivers for which the respective port as the output destination thereof is to be switched, the selection occurring from the plurality of device drivers installed in the information processing apparatus; and
    a switching step of switching the port set correspondingly to each of the plurality of device drivers selected according to the selection step from the port monitored by the first port monitor to the port monitored by the second port monitor when a system, which is for accounting the output jobs by using the job information collected by the second port monitor, is constructed,
    wherein the second port monitor, which is different from the first port monitor, is dedicated to the system, and
    wherein, in said switching step, the respective ports for the plurality of the device drivers are switched synchronously.

8. An information processing method as claimed in claim 7,
    wherein said switching step comprises a determining step of determining a port associated with each of at least some of the plurality of device drivers, and
    wherein the selecting step includes displaying, for each of the device drivers determined in said determining step, a name of the associated port and a name of the associated device driver, and allowing selection of device drivers from the displayed names of device drivers.

9. An information processing method as claimed in claim 7, further comprising a judging step of judging whether the switching in said switching step should be carried out either in response to a selection instruction from a user or automatically, when the system for accounting the output jobs is constructed.

10. An information processing method as claimed in claim 7, wherein said switching step comprises, when the system for accounting the output jobs is constructed, determining whether or not the first port monitor is of a predetermined type, and if the first port monitor is of the predetermined type, performing the switching, whereas if the first port monitor is not of the predetermined type, displaying a warning.

11. An information processing method as claimed in claim 7, further comprising a job information collecting step of collecting the job information via an application program interface and delivering the collected job information to another information processing apparatus, and a control step of controlling the second port monitor in said job information collecting step such that the second port monitor notifies the receipt of the output job when the output job is received.

12. An information processing method as claimed in claim 7, wherein the peripheral apparatuses include a printer, a copying machine, and a scanner.

13. A job management system comprising an information processing apparatus that has a plurality of device drivers installed therein for generating respective output jobs, each output job to be output to at least one of a plurality of peripheral apparatuses, and is configured to output each of the output jobs to at least one of the peripheral apparatuses via a first port monitor that, for each of the plurality of device drivers, is preset to monitor a port as an output destination of the corresponding device driver, the job management system further comprising a job management apparatus that acquires job information on each of the output jobs from said information processing apparatus and manages the job information, the respective ports monitored by the first port monitor for each of the plurality of device drivers are set in advance by an operation system installed in the information processing apparatus or are LPR ports, wherein said information processing apparatus comprises:

a second port monitor that, for each of the plurality of device drivers, receives the corresponding output job generated by the corresponding device driver and delivers the corresponding output job to at least one of the peripheral apparatuses, said second port monitor collecting job information including setting information on each of the output jobs;

a selection device that allows selection of device drivers for which the respective port as the output destination thereof is to be switched, the selection occurring from the plurality of device drivers installed in the information processing apparatus; and a switching device that is operable when a system, which is for accounting the output jobs by using the job information collected by said second port monitor, is constructed, to switch the port set correspondingly to each of the plurality of device drivers selected via the selection device from the port monitored by the first port monitor to a port monitored by said second port monitor, wherein said second port monitor, which is different from the first port monitor, is dedicated to the system.

14. A non-transitory computer-readable storage medium storing an information processing program that is executable by a computer for implementing an information processing method for an information processing apparatus, the information processing apparatus having a plurality of device drivers installed therein for generating respective output jobs, each output job to be output to at least one of a plurality of peripheral apparatuses, the information processing apparatus configured to output each of the output jobs to at least one of the peripheral apparatuses via (a) a first port monitor that, for each of the plurality of device drivers, is preset to monitor a port as an output destination of the corresponding device driver, or (b) a second port monitor that monitors a port that can be set a port for each of the plurality of device drivers, the respective ports monitored by the first port monitor for each of the plurality of device drivers are set in advance by an operation system installed in the information processing apparatus or are LPR ports, the information processing program comprising:

an outputting and collecting module for, for each of the plurality of device drivers, receiving the corresponding output job generated by the corresponding device driver, delivering the corresponding output job to at least one of the peripheral apparatuses, and collecting job information including setting information on each of the output jobs, using the second port monitor;

a selection module for allowing selection of device drivers for which the respective port as the output destination thereof is to be switched, the selection occurring from the plurality of device drivers installed in the information processing apparatus; and a switching module for switching the port set correspondingly to each of the plurality of device drivers selected according to the selection module from the port monitored by the first port monitor to the port monitored by the second port monitor when a system, which is for accounting the output jobs by using the job information collected by the second port monitor, is constructed, wherein the second port monitor, which is different from the first port monitor, is dedicated to the system, and wherein said switching module is operable to switch the respective ports for the plurality of the device drivers synchronously.

15. A non-transitory computer-readable storage medium as claimed in claim 14, wherein said switching module comprises a determining module for determining a port associated with each of at least some of the plurality of device drivers, and wherein the selecting module also is for displaying, for each of the device drivers determined in said determining step, a name of the associated port and a name of the associated device driver, and allowing selection of device drivers, from the displayed names of device drivers.

16. A non-transitory computer-readable storage medium as claimed in claim 14, wherein the information processing program further comprises a judging module for judging whether the switching by said switching module should be carried out either in response to a selection instruction from a user or automatically, when the system for accounting the output jobs is constructed.

17. A non-transitory computer-readable storage medium as claimed in claim 14, wherein when the system for accounting the output jobs is constructed, said switching module is for determining whether or not the first port monitor is of a predetermined type, and if the first port monitor is of the predetermined type, said switching module instructs performing of the switching, whereas if the first port monitor is not of the predetermined type, said switching module instructs displaying a warning.

18. A non-transitory computer-readable storage medium as claimed in claim 14, wherein the information processing program further comprises:

a job information collecting module for collecting the job information via an application program interface and delivering the collected job information to another information processing apparatus, and a control module for controlling the second port monitor such that the second port monitor notifies said job information collecting module of the receipt of the output job, when the output job is received.

19. A non-transitory computer-readable storage medium as claimed in claim 14, wherein the peripheral apparatuses include a printer, a copying machine, and a scanner.

20. An information processing apparatus as claimed in claim 1, wherein the job information includes at least one of a number of print sheets, a number of pages, a print size, a type of sheets to be used, information indicative of whether the printing is to be executed in a single-sided printing mode or a double-sided printing mode, and N in 1 print information.

21. An information processing apparatus as claimed in claim 1, wherein the respective ports for the plurality of the device drivers are switched synchronously in response to a single instruction inputted from a user.

22. An information processing method as claimed in claim 7, wherein the job information includes at least one of a number of print sheets, a number of pages, a print size, a type of sheets to be used, information indicative of whether the printing is to be executed in a single-sided printing mode or a double-sided printing mode, and N in 1 print information.

23. An information processing method as claimed in claim 7, wherein the respective ports for the plurality of the device drivers are switched synchronously in response to a single instruction inputted from a user.

24. A non-transitory computer-readable storage medium as claimed in claim 14, wherein the job information includes at least one of a number of print sheets, a number of pages, a print size, a type of sheets to be used, information indicative of whether the printing is to be executed in a single-sided printing mode or a double-sided printing mode, and N in 1 print information.

25. A non-transitory computer-readable storage medium as claimed in claim 14, wherein the respective ports for the plurality of the device drivers are switched synchronously in response to a single instruction inputted from a user.

26. An information processing apparatus as claimed in claim 1, wherein the respective ports monitored by said first port monitor for each of the plurality of device drivers are set in advance by the operation system installed in the information processing apparatus and are standard TCP/IP ports.

27. An information processing method as claimed in claim 7, wherein the respective ports monitored by said first port monitor for each of the plurality of device drivers are set in advance by the operation system installed in the information processing apparatus and are standard TCP/IP ports.

28. A job management system as claimed in claim 13, wherein the respective ports monitored by said first port monitor for each of the plurality of device drivers are set in advance by the operation system installed in the information processing apparatus and are standard TCP/IP ports.

29. A non-transitory computer-readable storage medium as claimed in claim 14, wherein the respective ports monitored by said first port monitor for each of the plurality of device drivers are set in advance by the operation system installed in the information processing apparatus and are standard TCP/IP ports.

\* \* \* \* \*